United States Patent
Kiyama et al.

(10) Patent No.: US 9,244,421 B2
(45) Date of Patent: Jan. 26, 2016

(54) DRIVE TRANSMISSION DEVICE AND IMAGE FORMING APPARATUS

(71) Applicant: CANON KABUSHIKI KAISHA, Tokyo (JP)

(72) Inventors: Kota Kiyama, Kawasaki (JP); Yuri Mori, Tokyo (JP); Seiji Hara, Tokyo (JP); Tadashi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/660,690

(22) Filed: Mar. 17, 2015

(65) Prior Publication Data
US 2015/0268614 A1    Sep. 24, 2015

(30) Foreign Application Priority Data

Mar. 19, 2014 (JP) ................. 2014-056229

(51) Int. Cl.
G03G 15/00   (2006.01)
F16H 7/02    (2006.01)
F16H 7/18    (2006.01)

(52) U.S. Cl.
CPC ............... *G03G 15/757* (2013.01); *F16H 7/02* (2013.01); *F16H 7/18* (2013.01)

(58) Field of Classification Search
CPC ........... G03G 15/757; F16H 7/02; F16H 7/18
See application file for complete search history.

(56) References Cited

U.S. PATENT DOCUMENTS

| 2005/0085945 | A1* | 4/2005 | Andoh | G03G 15/757 700/230 |
| 2006/0153604 | A1* | 7/2006 | Matsuda | G03G 15/0131 399/301 |
| 2012/0051788 | A1* | 3/2012 | Tsuji | G03G 15/757 399/167 |

FOREIGN PATENT DOCUMENTS

JP    H08-146783 A    6/1996

* cited by examiner

*Primary Examiner* — Sandra Brase
(74) *Attorney, Agent, or Firm* — Canon U.S.A., Inc. IP Division

(57) ABSTRACT

A drive transmission device having motor, a first pulley configured to be driven to rotate by the motor, a second pulley configured to be connected to a device, and a belt unit configured to be wound around the first pulley and the second pulley. The belt unit includes a metal layer and a dielectric layer configured to be provided between the first pulley and the metal layer and between the second pulley and the metal layer. The drive transmission device also includes a voltage supply unit configured to supply voltage to cause attraction between the first and second pulleys and the belt and a controller configured to control the voltage of the voltage supply unit based on information indicating load of the device.

20 Claims, 20 Drawing Sheets

DRIVE TRANSMISSION DEVICE AND IMAGE FORMING APPARATUS

BACKGROUND OF THE INVENTION

1. Field of the Invention

The present invention relates to a drive transmission device in which rotary force of a driving source is transmitted to a driven unit through a belt wound around a driving pulley and a driven pulley, and the like.

2. Description of the Related Art

Various known apparatuses, such as image forming apparatuses, include a drive transmission device in which rotary force of a driving source, such as a motor, is transmitted to a driven unit.

For example, in an image forming apparatus, driving force of a motor as a driving source is transmitted to a driving roller which drives a driven unit (for example, a photosensitive drum or an intermediate transfer belt) through a plurality of gears. However, the configuration of transmitting driving force using gears has had a problem that vibrations may occur in the image forming apparatus due to vibromotive force caused by a rotation transmission error (especially, an engagement transmission error) between a driving gear and a driven gear. There has been a possibility that vibrations which have occurred at the gears are transmitted to supporting members, such as a shaft, a bearing, and a side plate, and generate noise.

There has been a known drive transmission device that includes a driving pulley, a driven pulley, and a belt wound around the pulleys, and transmits rotational driving force of a driving source (motor) to a driven unit by using friction force between the individual pulleys and the belt. However, in the case where the driving force is transmitted using such a device, if the driving force is increased excessively, slippage of the belt occurs. Therefore, the driving force of the driving source cannot be transmitted to the driven unit with high accuracy.

As described in Japanese Patent Laid-Open No. 08-146783, there has been a technique of increasing the friction force between a pulley and a belt by allowing electrostatic attraction between the belt and the pulley, and suppressing slippage of the belt. The image forming apparatus described in Japanese Patent Laid-Open No. 08-146783 applies a bias to a core metal of a driving roller as the pulley to cause electrostatic attraction force to act between the driving roller and the intermediate transfer belt, and thus transmits the driving force of the driving roller to the intermediate transfer belt.

In the technique described in Japanese Patent Laid-Open No. 08-146783, the larger the potential difference between the individual pulleys and the belt, the larger the electrostatic attraction force. Therefore, a high voltage is applied to the pulleys to prevent slippage of the belt.

Furthermore, a load applied to a driven unit is not necessarily constant but may vary. Taking into consideration variations of the load onto the driven unit, it is necessary to set a high set value of an applied voltage for the case of the maximum load condition, in order to reliably prevent the occurrence of slippage between the pulleys and the belt. However, applying a high voltage to the pulley or the belt increases power consumption.

The present invention has been designed to solve the problems of the related art. The present invention appropriately suppresses the slippage between a pulley and a belt by efficiently generating a necessary friction force without performing excessive voltage application.

SUMMARY OF THE INVENTION

The present invention reduces power consumed for transmitting driving force, by appropriately controlling a voltage applied when a pulley and a belt are attracted to each other.

According to an aspect of the present invention, there is provided a drive transmission device including a motor; a first pulley configured to be driven to rotate by the motor; a second pulley configured to be connected to a device; a belt unit configured to be wound around the first pulley and the second pulley, the belt unit including a metal layer, and a dielectric layer configured to be provided between the first pulley and the metal layer and between the second pulley and the metal layer; a voltage supply unit configured to supply voltage to the first pulley, the second pulley, or the belt; an acquisition unit configured to acquire information indicating load of the device; and a controller configured to control the voltage supplied from the voltage supply unit, based on the information acquired by the acquisition unit, and to generate an attraction force between the first pulley and the metal layer of the belt and an attraction force between the second pulley and the metal layer.

According to another aspect of the present invention, there is provided a drive transmission device including a motor; a first pulley including a dielectric layer and configured to be driven to rotate by the motor; a second pulley including a dielectric layer and configured to be connected to a device; a belt unit configured to be wound around the first pulley and the second pulley, the belt unit including a metal layer; a voltage supply unit configured to supply voltage to the first pulley, the second pulley, or the belt; an acquisition unit configured to acquire information indicating load of the device; and a controller configured to control the voltage supplied from the voltage supply unit based on the information acquired by the acquisition unit and to generate an attraction force between the first pulley and the metal layer of the belt and an attraction force between the second pulley and the metal layer of the belt.

Further features of the present invention will become apparent from the following description of exemplary embodiments with reference to the attached drawings.

DESCRIPTION OF THE EMBODIMENTS

Hereinafter, embodiments of the present invention will be described below with reference to the drawings.

First Embodiment

In a first embodiment of the present invention, a printer of an electrophotographic type as an image forming apparatus will be described as an example of an apparatus to which a drive transmission device is applied. A basic configuration and operation of the image forming apparatus will be described with reference to FIG. 1 and FIG. 2.

Figure 1:
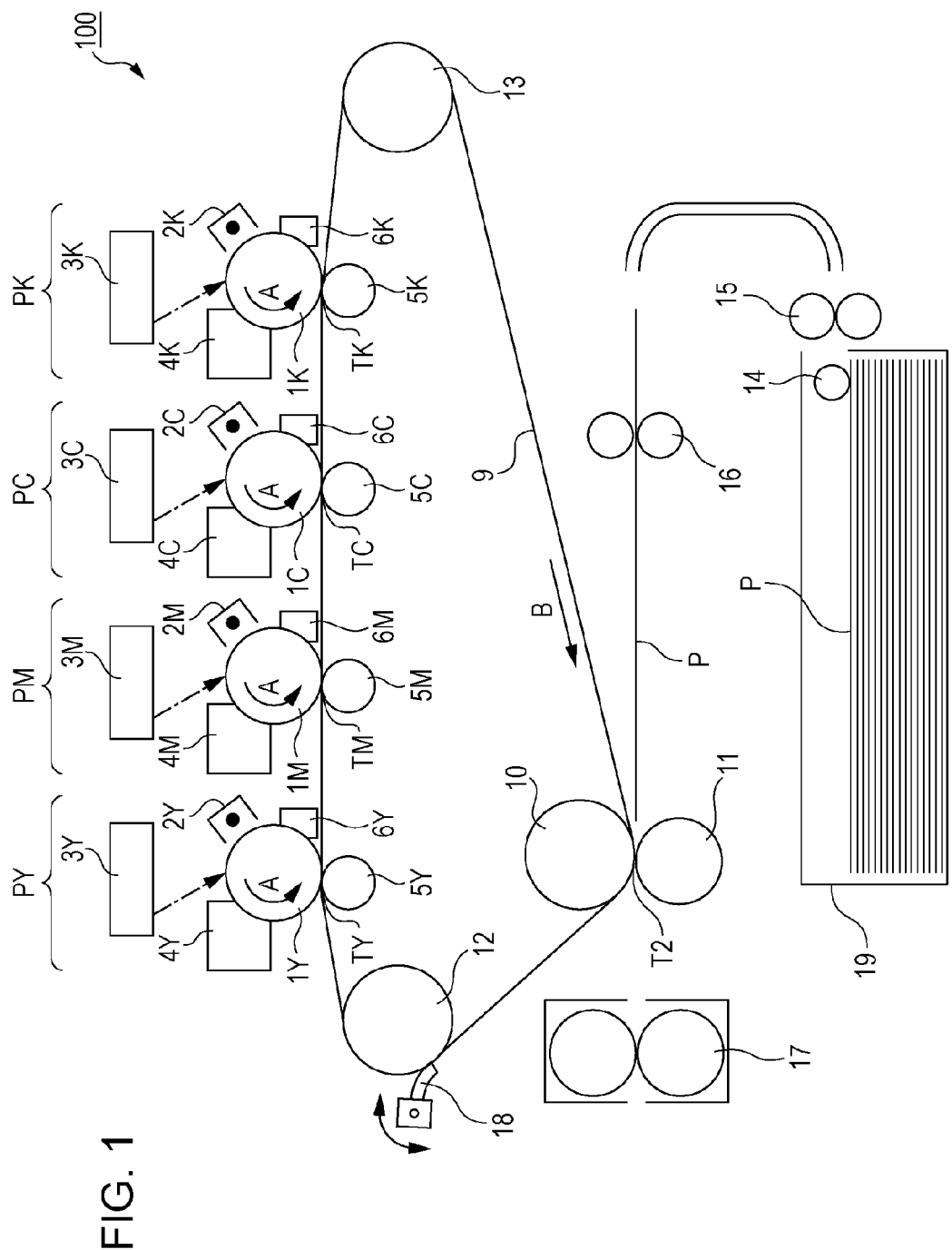
FIG. 1 is a schematic cross-sectional view of an image forming apparatus.

FIG. 1 is a schematic cross-sectional view of an image forming apparatus 100.

The image forming apparatus 100 is a full-color laser beam printer with image forming units PY, PM, PC, and PK for yellow, magenta, cyan, and black, respectively, arranged along an intermediate transfer belt 9.

In the image forming unit PY, a yellow toner image is formed on a photosensitive drum 1Y which is driven to rotate, and the yellow toner image is carried and conveyed by rotation of the photosensitive drum 1Y. At a primary transfer section TY, the yellow toner image is primarily transferred to the intermediate transfer belt 9 by a primary transfer roller 5Y. Similarly, at the image forming units PM, PC, and PK, a magenta toner image, a cyan toner image, and a black toner image are formed on photosensitive drums 1M, 1C, and 1K, respectively. Then, at primary transfer sections TM, TC, and TK, the toner images of the respective colors are sequentially superimposed on each other and primarily transferred to the intermediate transfer belt 9 by primary transfer rollers 5M, 5C, and 5K.

The image forming apparatus 100 have two printing modes: a color printing mode and a monochrome printing mode. In the color printing mode, as described above, toner images are formed at the image forming units of four colors: PY, PM, PC, and PK. In the monochrome printing mode, none of the image forming units PY, PM, and PC operate and a toner image is formed only at the image forming unit PK.

The intermediate transfer belt 9 is stretched over and supported by a driving roller 13, a tension roller 12, and a backup roller 10, and is rotated along with the rotation of the driving roller 13 in the direction of an arrow B in FIG. 1. The intermediate transfer belt 9 is stretched in the upward direction in FIG. 1 by the primary transfer rollers 5Y to 5K. Between the primary transfer rollers 5Y to 5K and the photosensitive drums 1Y to 1K, the primary transfer sections TY, TM, TC, and TK are formed.

The toner images which are transferred from the image forming units PY, PM, PC, and PK and carried by the intermediate transfer belt 9 are conveyed to a secondary transfer section T2 along with the rotation of the intermediate transfer belt 9 and secondarily transferred to a recording member P.

The recording member P is pulled out from a sheet feeding cassette 19 by a sheet feeding roller 14, separated one by one by a separating device 15, and sent to a registration roller 16. The registration roller 16 aligns the head of the recording member P with the head of the toner images carried by the intermediate transfer belt 9, and feeds the recording member P to the secondary transfer section T2. The recording member P to which the toner images have been secondarily transferred is delivered to a fixing device 17 where heat and pressure are applied, and thus images are fixed onto the surface of the recording member P.

An intermediate transfer belt cleaning device 18 is installed such that a cleaning blade, which is a contact/separation member driven by a driving source (not illustrated), can be made in contact with and separated from the intermediate transfer belt 9. During a normal printing operation, the cleaning blade of the intermediate transfer belt cleaning device 18 is in contact with the intermediate transfer belt 9, and the cleaning blade removes transfer residual toner which has passed through the secondary transfer section T2 and left on the intermediate transfer belt 9. During an operation of a transfer voltage adjustment mode or a laser beam quantity adjustment mode which does not involve the transfer of toner images to the intermediate transfer belt 9, the cleaning blade is separated from the intermediate transfer belt 9 so as to prevent degradation of the intermediate transfer belt 9.

A charging device 2 (2Y, 2M, 2C, and 2K), an exposure device 3 (3Y, 3M, 3C, and 3K), and a developing device 4 (4Y, 4M, 4C, and 4K) are placed around the photosensitive drum 1 (1Y, 1M, 1C, and 1K). Furthermore, the primary transfer roller 5 (5Y, 5M, 5C, and 5K) and cleaning device 6 (6Y, 6M, 6C, and 6K) are also placed around the photosensitive drum 1 (1Y, 1M, 1C, and 1K).

Next, details of the image forming unit P will be described with reference to FIG. 2. The image forming units PY, PM, PC, and PK are configured in a similar manner, except that the attached developing devices 4Y, 4M, 4C, and 4K use toner of different colors, which are, yellow, magenta, cyan, and black. Therefore, as a representative, the image forming unit PY for yellow will be explained, and as for the image forming units PM, PC, and PK, the trailing symbol Y in the described configuration will be replaceable with C, M and K.

Figure 2:
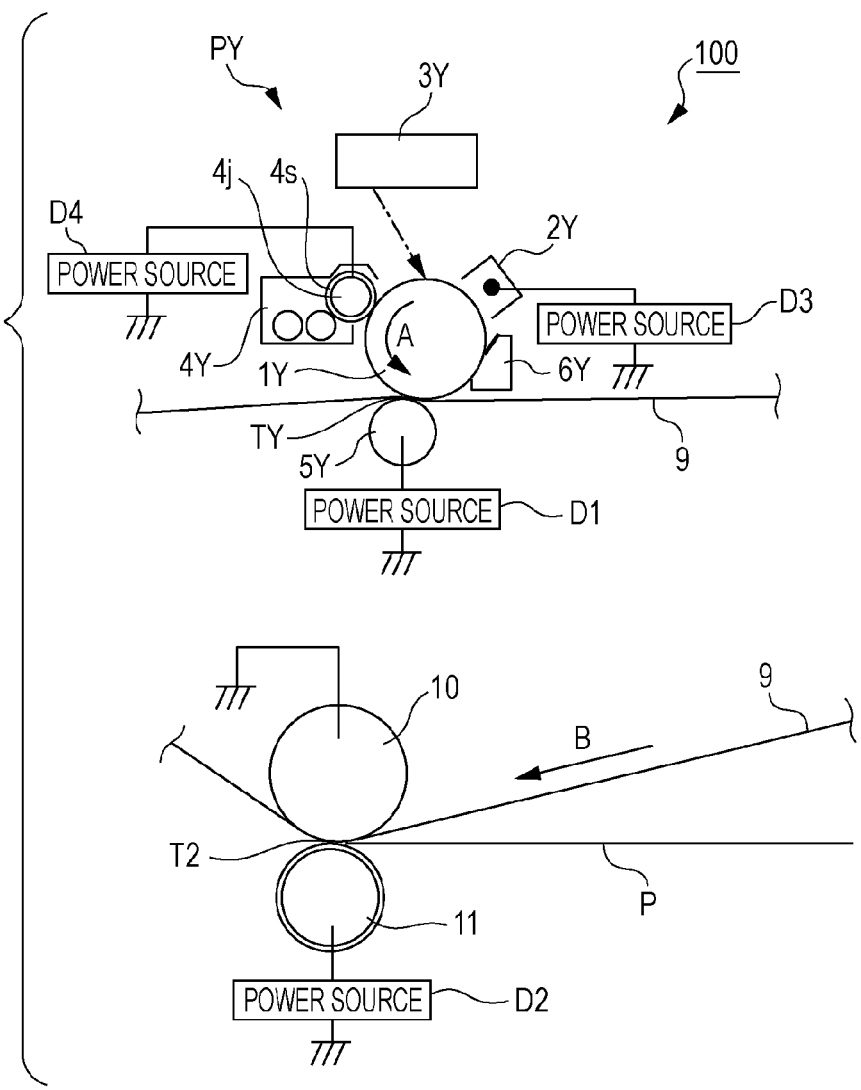
FIG. 2 is a cross-sectional view of a main part of an image forming apparatus.

FIG. 2 is a cross-sectional view of the image forming unit PY, the primary transfer section, and the secondary transfer section T2.

The photosensitive drum 1Y is formed of an aluminum cylinder with an outer circumferential surface coated with an organic photoconductor layer which has a negative charge polarity. The photosensitive drum 1Y rotates in the direction of an arrow A. A charging device 2Y is applied with a negative voltage from a power source D3, and the charging device 2Y applies charged particles to the surface of the photosensitive drum 1Y. Thus, the surface of the photosensitive drum 1Y is charged uniformly at a potential of negative polarity. The exposure device 3Y scans, with a rotary mirror, laser beams which are ON-OFF modulated in accordance with scanning line image data obtained by expanding a separation color image of yellow, and applies the laser beams onto the surface of the photosensitive drum 1Y. Thus, an electrostatic image corresponding to the image data is formed on the surface of the charged photosensitive drum 1Y.

The developing device 4Y stirs a two-component developer which is a mixture of toner and magnetic carriers, and charges the toner to the negative polarity. The charged toner is carried in a napped state by a developing sleeve 4s which rotates around a fixed magnetic pole 4j in a counter direction with respect to the photosensitive drum 1Y, and rubs against the photosensitive drum 1Y.

The power source D4 applies to the developing sleeve 4s a developing voltage in which an AC voltage is superimposed on a negative DC voltage, and attaches the toner to the electrostatic image on the photosensitive drum 1Y whose polarity has become relatively more positive than that of the developing sleeve 4s. Then, the electrostatic image is developed as a toner image.

The primary transfer roller 5Y nips the intermediate transfer belt 9 between the primary transfer roller 5Y and the photosensitive drum 1Y, and forms the primary transfer section TY between the photosensitive drum 1Y and the intermediate transfer belt 9. The power source D1 applies to the primary transfer roller 5Y a positive DC voltage, and primarily transfers the toner image which is negatively charged and carried by the photosensitive drum 1Y to the intermediate transfer belt 9, which passes through the primary transfer section TY. The cleaning device 6Y rubs against the photosensitive drum 1Y with the cleaning blade, and removes transfer residual toner which has passed through the primary transfer section TY and left on the surface of the photosensitive drum 1Y.

The secondary transfer roller 11 is brought into press-contact with the backup roller 10 through the intermediate transfer belt 9, and forms the secondary transfer section T2 between the intermediate transfer belt 9 and the secondary transfer roller 11. The secondary transfer section T2 nips and conveys the recording member P superimposed on the toner image of the intermediate transfer belt 9, and in the process where the recording member P passes through the secondary transfer section T2, secondarily transfers the toner image from the intermediate transfer belt 9 to the recording member P.

The power source D2 applies a positive DC voltage to the secondary transfer roller 11, and supplies a transfer current to a series circuit of the backup roller 10, the intermediate transfer belt 9, the recording member P, and the secondary transfer roller 11. The transfer current relates to the movement of the toner from the intermediate transfer belt 9 to the recording member P.

In the first embodiment, three configuration examples of a drive transmission device are described, in which rotary force of a driving source is transmitted and a driven unit is thus driven to rotate. First, in the first example to which a drive transmission device 50 (FIG. 3 to FIG. 9) is applied, the photosensitive drums 1Y to 1K are exemplified as a driven unit, and a motor 20 is exemplified as a driving source. In the second example to which a drive transmission device 51 (FIG. 10 and FIG. 11) is applied, the driving roller 13 which drives the intermediate transfer belt 9 is exemplified as a driven unit, and a motor 60 is exemplified as a driving source.

In the third example to which a drive transmission device 52 (FIG. 12 and FIG. 13) is applied, a pressure roller 40 of the fixing device 17 is exemplified as a driven unit, and a motor 70 is exemplified as a driving source.

However, it is not essential to provide three exemplary configurations at the same time to which a drive transmission device is applied. At least one configuration suffices. When multiple exemplary configurations are provided at the same time, operational control is performed concurrently.

Figure 3:
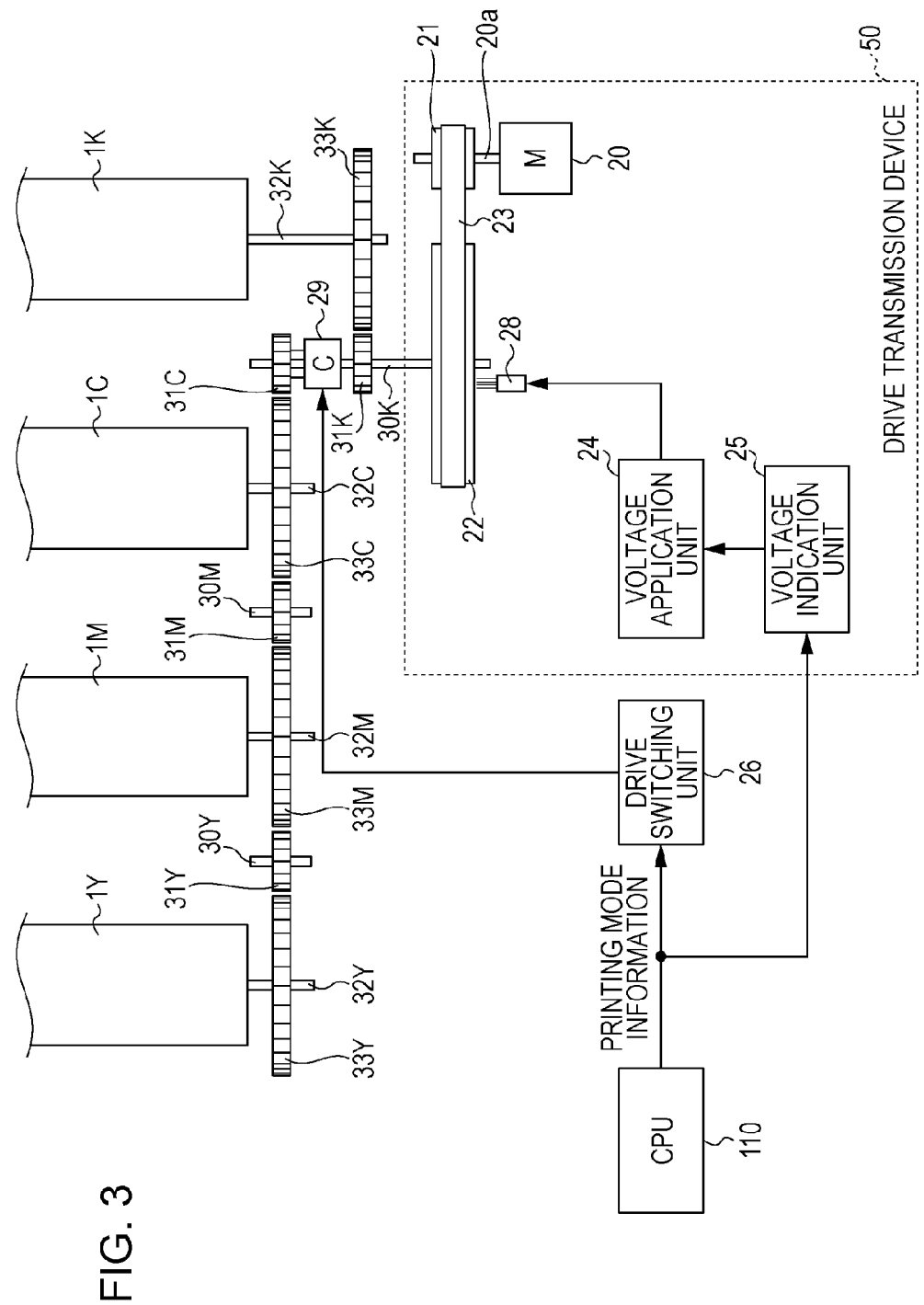
FIG. 3 is a schematic diagram illustrating a drive transmission device which transmits driving force to a photosensitive drum.

FIG. 3 is a schematic diagram illustrating a configuration of the drive transmission device 50 and its surroundings according to the first configuration example.

As illustrated in FIG. 3, the drive transmission device 50 includes a voltage application unit 24, a voltage indication unit 25, the motor 20, a driving pulley 21, a driven pulley 22, and a belt 23 which is endless. The belt 23 is stretched over the driving pulley 21 and the driven pulley 22, and force is transmitted by friction force between the belt 23 and the pulleys 21 and 22.

Gears 31K, 31M, 31Y and gears 33K, 33C, 33M, and 33Y are installed at shafts 30K, 30M, and 30Y and shafts 32K, 32C, 32M, and 32Y, respectively. Between the shaft 30K of the gear 31K and a gear 31C, an electromagnetic clutch 29 is provided. Rotational driving force of the motor 20 is transmitted to the photosensitive drums 1K, 1C, 1M and 1Y, through the driving pulley 21, the belt 23, the driven pulley 22, the gears 31K, 31C, 31M and 31Y, and the gears 33K, 33C, 33M, and 33Y.

When the electromagnetic clutch 29 is ON, rotation of the shaft 30K is transmitted to the gear 31C. When the electromagnetic clutch 29 is OFF, transmission is blocked. Therefore, when the electromagnetic clutch 29 is ON, the four photosensitive drums 1Y to 1K rotate. In contrast, when the electromagnetic clutch 29 is OFF, only the photosensitive drum 1K rotates.

Next, drive transmission using electrostatic attraction force will be described.

Figure 4A:
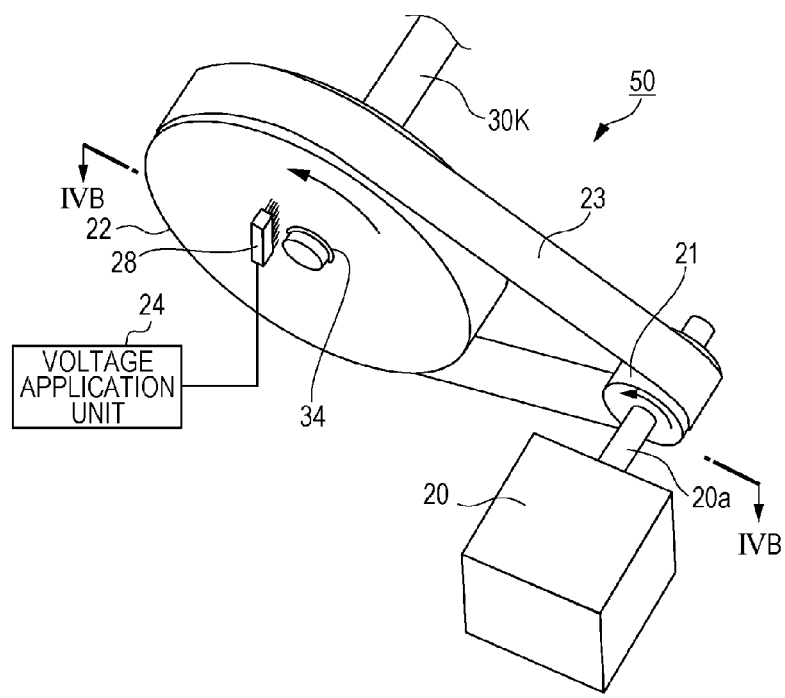
FIG. 4A is a perspective view of a main part of a drive transmission device.
Figure 4B:
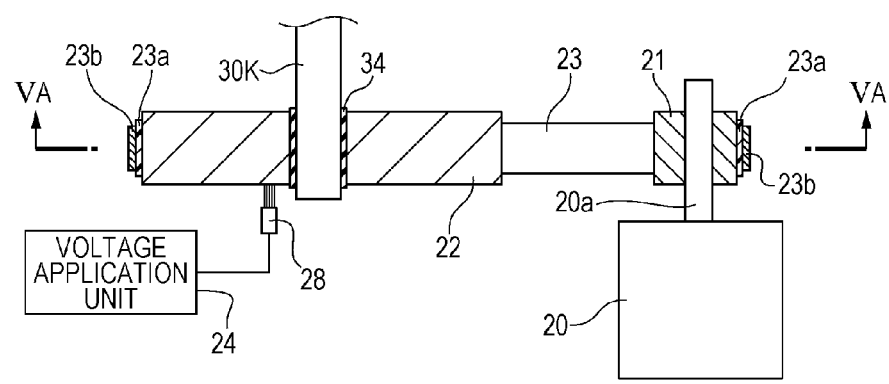
FIG. 4B is a cross-sectional view of a drive transmission device taken along line IVB-IVB of FIG. 4A.
Figure 5A:
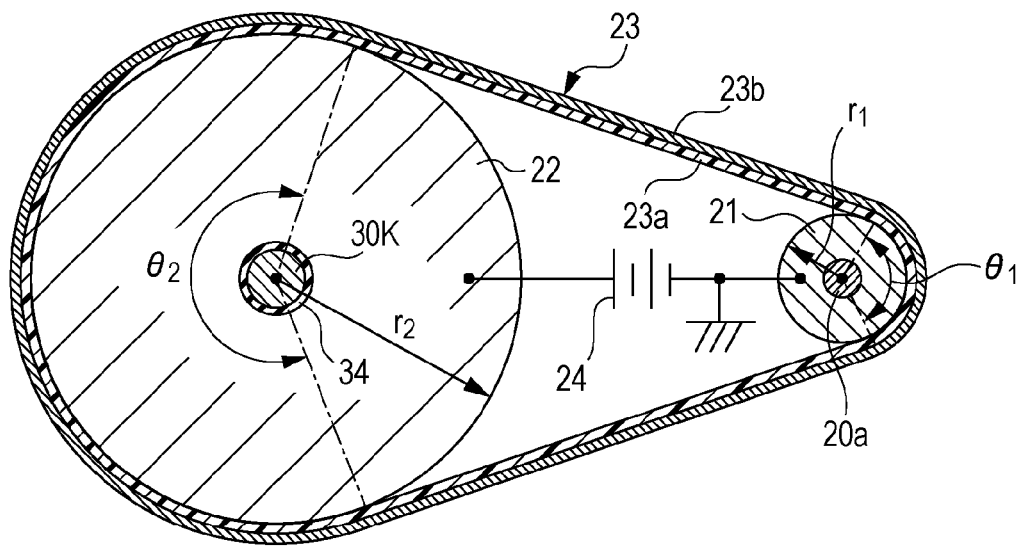
FIG. 5A is a cross-sectional view of a drive transmission device taken along line VA-VA of FIG. 4B.
Figure 5B:
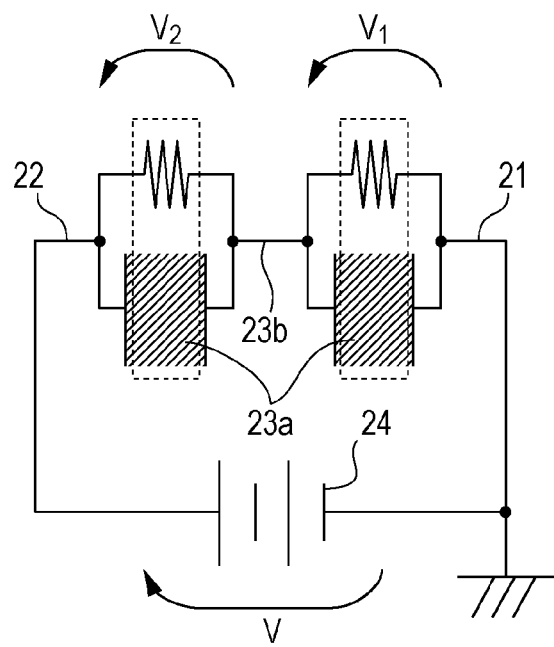
FIG. 5B is a schematic diagram of an equivalent circuit of a drive transmission device.

FIG. 4A is a perspective view of a main part of the drive transmission device 50. FIG. 4B is a cross-sectional view taken along line IVB-IVB of FIG. 4A. FIG. 5A is a cross-sectional view taken along line VA-VA of FIG. 4B, and applied voltage is additionally illustrated in a schematic manner. FIG. 5B is a diagram illustrating an equivalent circuit representing electrical characteristics of the drive transmission device 50.

The driving pulley 21 is connected to an output shaft 20a of the motor 20. The driving pulley 21 is made of a metal material formed into a cylindrical shape, and is electrically grounded (see FIG. 5A). The driven pulley 22 is, similarly to the driving pulley 21, made of a metal material formed into a cylindrical shape. To the driven pulley 22, a DC voltage is applied from a voltage application unit 24, which is a DC high voltage power source, via an electro-conductive brush 28. The connection part between the driven pulley 22 and the shaft 30K is insulated by an insulation member 34.

By the voltage applied from the voltage application unit 24, a potential difference is provided between the driving pulley 21 and the belt 23 and between the driven pulley 22 and the belt 23. Thus, the electrostatic attraction force is generated between the driving pulley 21 and the belt 23 and between the driven pulley 22 and the belt 23. A voltage value applied to the driven pulley 22 is determined by the voltage indication unit 25. As described later, the drive transmission device 50 is configured to increase friction force, which contributes to drive transmission, by the electrostatic attraction force, and therefore, initial tensile force (tension) given to the belt 23 can be small, which is assumed to be 0.5 kgf in this case.

As illustrated in FIG. 4B and FIG. 5A, the belt 23 has a double-layer structure, including a dielectric layer 23a on the side in contact with the pulleys 21 and 22 (inner side of the ring shape), and a metal layer 23b which is an electro-conductive part on the outer side of the dielectric layer 23a. The dielectric layer 23a is made of a polyimide resin material with a thickness of about 70 micrometers and a width of about 10 millimeters. The metal layer 23b is formed by sputtering of Ni or the like, with a thickness of about 100 nanometers. The width of the metal layer 23b of the belt 23 is narrower than that of the dielectric layer 23a, with a larger creepage distance from the surface of the pulleys to prevent electric discharge.

Next, an electrical action of the drive transmission device 50 will be described with reference to FIG. 5B. As described above, the drive transmission device 50 is configured, electrically, to include the driving pulley 21 which is grounded, the driven pulley 22 which is applied with voltage, and the belt 23 whose metal layer 23b is floated (electrically ungrounded state). In such a configuration, the driving pulley 21 and the driven pulley 22 face the metal layer 23b of the belt 23 with the dielectric layer 23a therebetween. Thus, the driving pulley 21, the driven pulley 22, and the metal layer 23b are connected through a virtual capacitor in addition to a resistive component.

This is illustrated as an equivalent circuit in FIG. 5B. That is, the driving pulley 21, the metal layer 23b of the belt 23, and the driven pulley 22 are electrically connected in series, in the circuit. Between the driving pulley 21 and the driven pulley 22, which correspond to electrodes of the virtual capacitor, and the metal layer 23b of the belt 23, an electric field is generated and electrostatic force acts, causing electrical attraction. As a result of the generation of the electrostatic attraction force, normal force is increased between the belt 23 and the pulleys 21 and 22, and friction force increases. Accordingly, slippage between the belt 23 and the pulleys 21 and 22 can be suppressed, enabling an increase of transmittable driving force.

As illustrated in FIG. 5A, the radius of the driving pulley 21 is represented by $r_1$, the winding angle of the belt 23 around the driving pulley 21 is represented by $\theta_1$, the radius of the driven pulley 22 is represented by $r_2$, and the winding angle of the belt 23 around the driven pulley 22 is represented by $\theta_2$. With the difference in the radius between the driving pulley 21 and the driven pulley 22 ($r_2 > r_1$), a deceleration system in which rotation in a part from the driving pulley 21 to the driven pulley 22 is decelerated is formed. In this case, $\theta_2$ is larger than $\theta_1$.

Next, an increase of the transmittable driving force which is caused by an action of electrostatic attraction force that is generated by application of voltage will be described.

Generally, when force transmission is performed using a belt, the force is transmitted through a change of tensile force between the entrance and the exit of a pulley. Therefore, the driving force is defined by the difference of the tensile force of the belt between the entrance and the exit, and the transmitted driving force is equal to this tensile force. The difference in the tensile force that can be generated depends on the maximum possible friction force generated between the pulley and the belt. Generally, in the drive transmission by a belt without using electrostatic attraction force, transmittable driving force $F_1$ can be expressed by Equation 1 below using the Euler formula.

$$F_1 = \frac{e^{\mu\theta} - 1}{e^{\mu\theta} + 1}\left(\frac{T}{\sin\frac{\theta}{2}}\right)$$

Here, tension which gives a belt the tensile force is represented by T. The winding angle of the belt around a pulley is represented by $\theta$, and a friction coefficient between the belt and the pulley is represented by $\mu$.

Furthermore, when the electrostatic attraction force per unit area is represented by P, the radius of the pulley is represented by r, and the facing width of a pulley electrode and the belt (hereinafter, may be referred to as an electrode facing width) is represented by b, then transmittable driving force $F_2$ for the case where the electrostatic attraction force P is added can be expressed by Equation 2 below. The electrode facing width b is the same as the width of the belt 23 in the first embodiment.

$$F_2 = \frac{e^{\mu\theta} - 1}{e^{\mu\theta} + 1}\left(\frac{T}{\sin\frac{\theta}{2}} + 2\cdot r\cdot b\, P\right)$$

That is, a transmittable driving force increment $\Delta F$ which includes the electrostatic attraction force P represents a difference between the driving force $F_1$ and the driving force $F_2$, and can be expressed by Equation 3 below.

$$\Delta F = F_2 - F_1 = \frac{e^{\mu\theta} - 1}{e^{\mu\theta} + 1}(2\cdot r\cdot b\cdot P)$$

The driving force $F_1$, the driving force $F_2$, and the increment $\Delta F$ can be obtained, for the driving pulley 21 and the driven pulley 22, by substituting a radius r ($r_1$, $r_2$) of the pulleys, an electrode facing width b, a friction coefficient $\mu$, and a winding angle $\theta$ ($\theta_1$, $\theta_2$) into Equations 1, 2, and 3, respectively.

Here, the permittivity of the dielectric layer 23a of the belt 23 is represented by $\in$, and the thickness is represented by d. The electrostatic attraction force P per unit area can be expressed by Equations 4 and 5 below when the electrostatic attraction force between the driving pulley 21 and the metal layer 23a is represented by $P_1$ and the electrostatic attraction force between the driven pulley 22 and the metal layer 23a is represented by $P_2$. The potential difference between the driving pulley 21 and the metal layer 23b is represented by $V_1$, and the potential difference between the driven pulley 22 and the metal layer 23b is represented by $V_2$.

$$P_1 = \frac{1}{2}\varepsilon\frac{1}{d^2}V_1^2$$
$$P_2 = \frac{1}{2}\varepsilon\frac{1}{d^2}V_2^2$$

Therefore, the transmittable driving force from the driving pulley 21 to the belt 23 can be obtained by substituting the electrostatic attraction force P ($P_1$, $P_2$), obtained by Equations 4 and 5, into Equation 2. It is understood that the transmittable driving force increases in proportion to the square of the voltage applied between the pulleys 21 and 22 and the belt 23.

Figure 6:
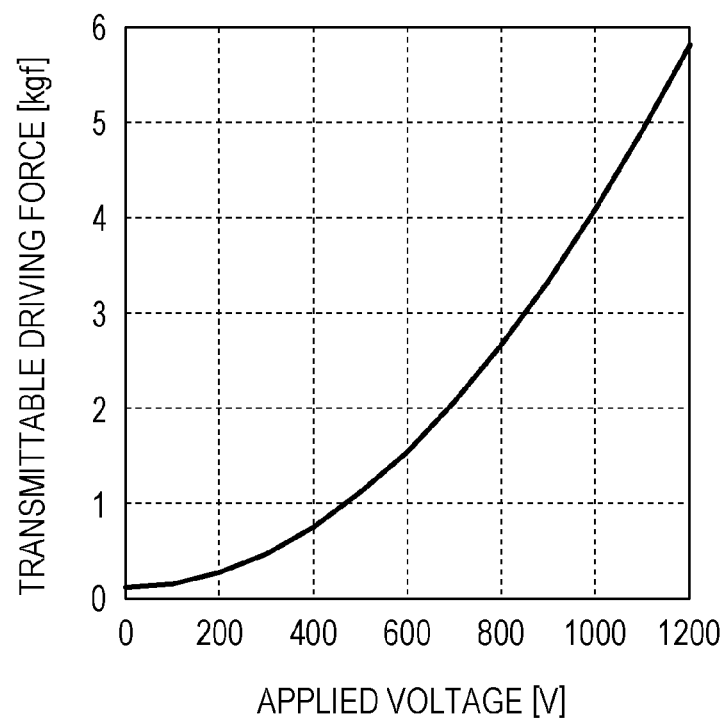
FIG. 6 is a graph illustrating an example of the relationship between an applied voltage and transmittable driving force.

FIG. 6 illustrates an example of the relationship between the transmittable driving force and the applied voltage, calculated from measurement results obtained from actually fabricated pulleys and belt. As illustrated in FIG. 6, it has been experimentally confirmed that the transmittable driving force increases in proportion to the square of the voltage applied.

Since the driving pulley 21 and the driven pulley 22 are different in the winding angle θ of the belt, the radius r of the pulley, and the voltage V applied between the pulley and the belt 23, the transmittable driving force is accordingly different between the driving pulley 21 and the driven pulley 22. As described above, since $r_2$ is larger than $r_1$ and $\theta_2$ is larger than $\theta_1$, the contact area of the driven pulley 22 with the belt 23 is larger than the contact area of the driving pulley 21 with the belt 23. Therefore, a resistive component of the driven pulley 22 in the equivalent circuit illustrated in FIG. 5B is smaller than that of the driving pulley 21, and the voltage V applied between the belt 23 and the driven pulley 22 is smaller than the voltage V applied between the belt 23 and the driving pulley 21 ($V_1 > V_2$).

As described above, the transmittable driving force is proportional to the square of the voltage V applied between the pulley and the belt. Therefore, when comparing the driven pulley 22 with the driving pulley 21, a small voltage V applied between the pulley and the belt has a greater effect than a large winding angle θ and a large radius r of the pulley. Accordingly, the transmittable driving force of the driven pulley 22 is smaller than that of the driving pulley 21, and slippage is thus easier to occur in the driven pulley 22 than the driving pulley 21. In order to prevent slippage, a voltage value of the voltage application unit 24 of the drive transmission device 50 is determined such that the transmittable driving force between the driven pulley 22 and the belt 23 is larger than a rotation load applied to the shaft 30K.

Next, referring back to the FIG. 3, drive transmission to the four photosensitive drums 1Y to 1K according to a printing mode will be described.

The image forming apparatus 100 includes a central processing unit (CPU) 110 and a drive switching unit 26. When printing mode information indicating whether the printing mode is a color printing mode or a monochrome printing mode is input from the CPU 110 to the drive switching unit 26, the drive switching unit 26 switches on or off the electromagnetic clutch 29 on the basis of the received printing mode information.

When the received printing mode information indicates the color printing mode, the drive switching unit 26 turns on the electromagnetic clutch 29, and the drive transmission device 50 enters a state where the rotation of the shaft 30K is transmitted to the gear 31C. When the received printing mode information indicates the monochrome printing mode, the drive switching unit 26 turns off the electromagnetic clutch 29, and the drive transmission between the shaft 30K and the gear 31C is blocked. Therefore, in the color printing mode, all of the photosensitive drums 1Y to 1K are controlled to rotate, while in the monochrome printing mode, only the photosensitive drum 1K is controlled to rotate. Thus, the printing mode information serves as "identification information" for identifying the operation state (a driven state or a non-driven state) of the photosensitive drum 1, which is a driven unit.

Since the photosensitive drums 1Y, 1M, and 1C do not rotate in the monochrome printing mode, the CPU 110 controls the photosensitive drums 1Y, 1M, and 1C to be separated from the intermediate transfer belt 9. This operation will be described with reference to FIGS. 7A and 7B.

Figure 7A:
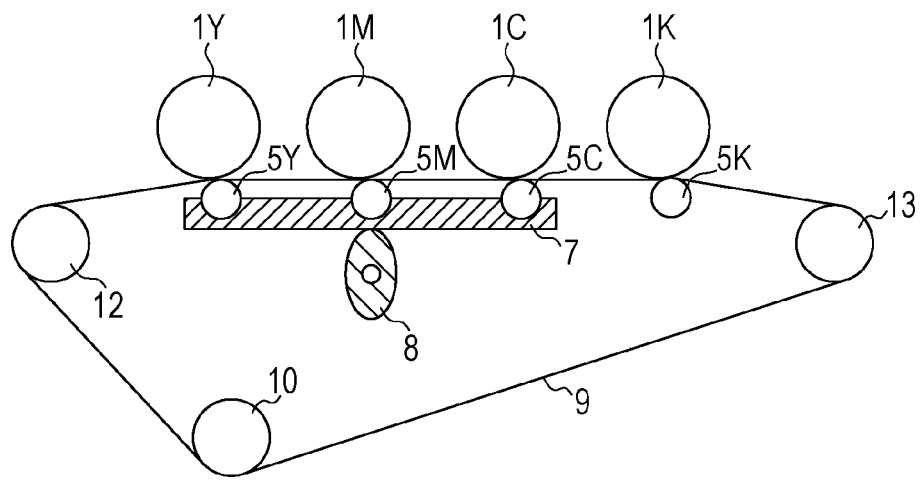
FIGS. 7A and 7B are schematic diagrams illustrating an in-contact/separated state between a photosensitive drum and an intermediate transfer belt.
Figure 7B:
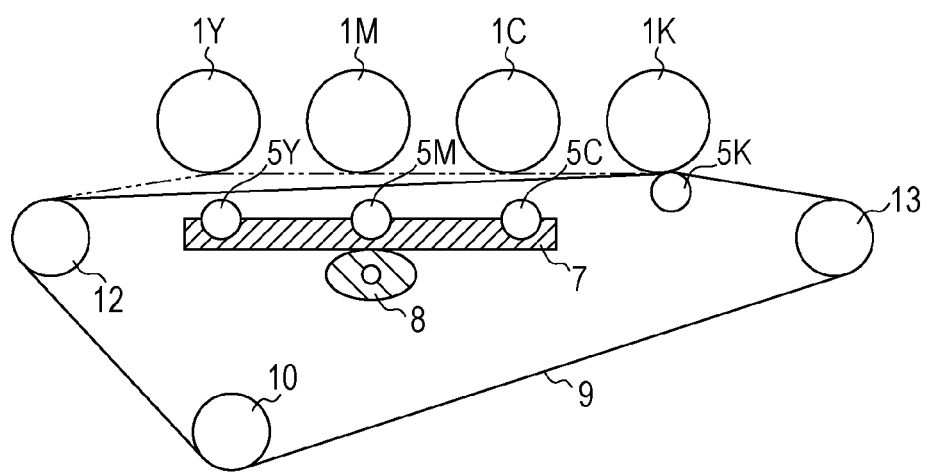

FIGS. 7A and 7B are schematic diagrams illustrating an in-contact/separated state between the photosensitive drum 1 and the intermediate transfer belt 9, in the color printing mode and the monochrome printing mode, respectively. The primary transfer rollers 5Y, 5M, and 5C are supported by a supporting member 7, and the supporting member 7 is vertically displaced by a cam 8 which is rotated by a driving source (not illustrated).

In the color printing mode, as illustrated in FIG. 7A, the cam 8 is in a rotational position to push up the supporting member 7. The intermediate transfer belt 9 is pulled up in the upward direction of FIG. 7A by the primary transfer rollers 5Y, 5M, and 5C, to be in contact with the photosensitive drums 1Y, 1M, and 1C. In the monochrome printing mode, as illustrated in FIG. 7B, the cam 8 rotates and the primary transfer rollers 5Y, 5M, and 5C descend together with the supporting member 7. Accordingly, the photosensitive drums 1Y, 1M, and 1C are separated from the intermediate transfer belt 9. The primary transfer roller 5K is fixed, and thus the photosensitive drum 1K and the intermediate transfer belt 9 are in contact with each other, regardless of the printing mode.

As illustrated in FIG. 3, printing mode information is also input to the voltage indication unit 25. In the voltage indication unit 25, voltage values to be applied to the driven pulley 22 in the color printing mode and the monochrome printing mode are stored in advance. The voltage indication unit 25 outputs to the voltage application unit 24 a voltage value, as a voltage indication value, in accordance with the received printing mode information.

A voltage value stored in the voltage indication unit 25, which serves as a storage unit, is a value obtained in advance by calculation or measurement and then stored. When entering the monochrome printing mode, the number of the photosensitive drums 1 that are driven to rotate changes into one from four, which is the number of the photosensitive drums 1 used in the color printing mode, and therefore load torque becomes about one quarter. That is, the driving force to be transmitted from the driving pulley 21 to the driven pulley 22 through the belt 23 becomes about one quarter.

Therefore, as for the voltage value stored in the voltage indication unit 25, according to the relationship described above that the transmittable driving force is proportional to the square of the applied voltage, the value of an applied voltage in the monochrome printing mode is about a half of the value of an applied voltage in the color printing mode. Specific voltage values are, for example, 800 V for the color printing mode and 400 V for the monochrome printing mode.

The voltage indication value output from the voltage indication unit 25 is input to the voltage application unit 24, and the voltage application unit 24 outputs a voltage of a value corresponding to the input voltage indication value. Then, the voltage is applied to the driven pulley 22 through the electroconductive brush 28.

Figure 8:
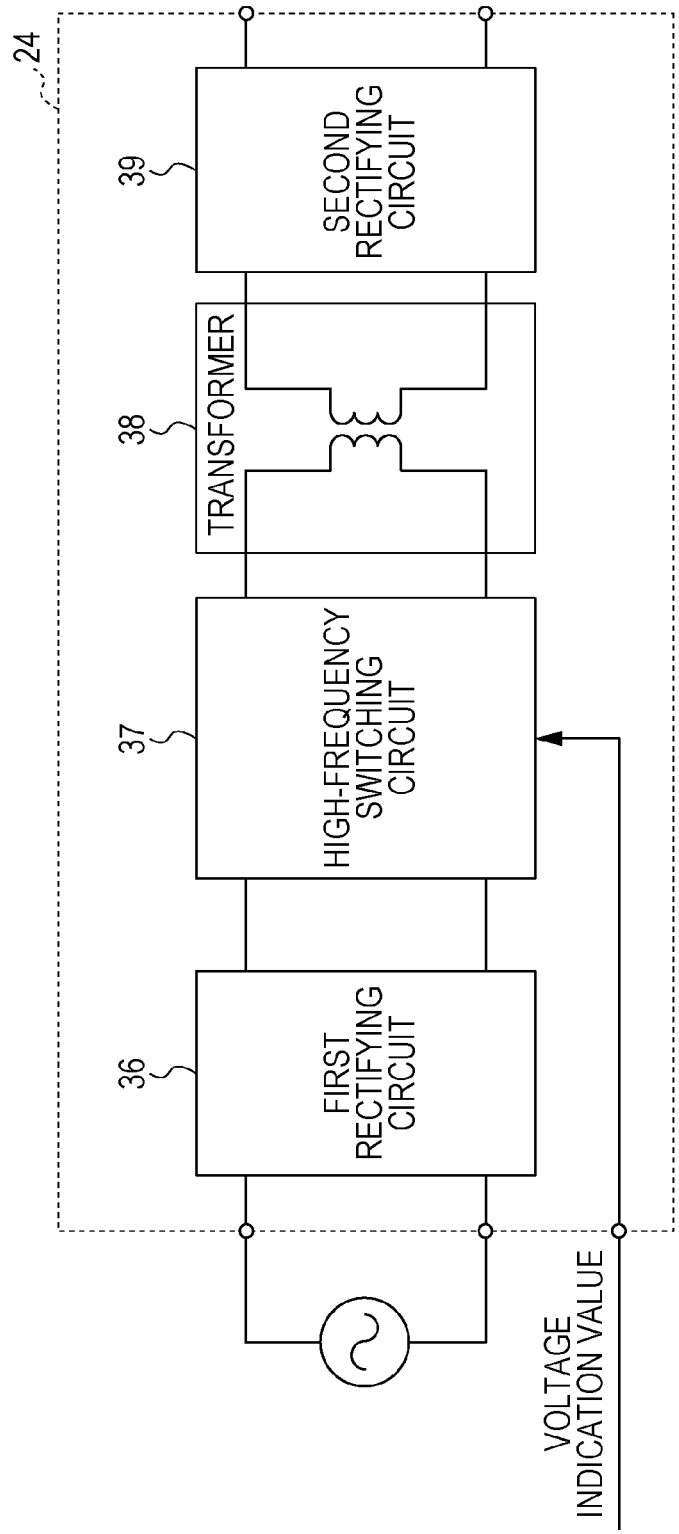
FIG. 8 is a schematic configuration diagram of a voltage application unit.

FIG. 8 is a diagram illustrating an internal configuration of the voltage application unit 24. An AC voltage received from a commercial power source is rectified into a DC voltage at a first rectifying circuit 36, switched on or off by a high-frequency switching circuit 37 to become a pulse-shaped voltage, and then applied to a primary side of a transformer 38. The secondary voltage boosted at the transformer 38 is rectified at a second rectifying circuit 39 and is output as a DC voltage. In the high-frequency switching circuit 37, a voltage is adjusted for output, by increase or decrease in pulse width which is switched on or off in accordance with the voltage indication value received from the voltage indication unit 25.

Next, an operation flow of the drive transmission device 50 will be described.

Figure 9:
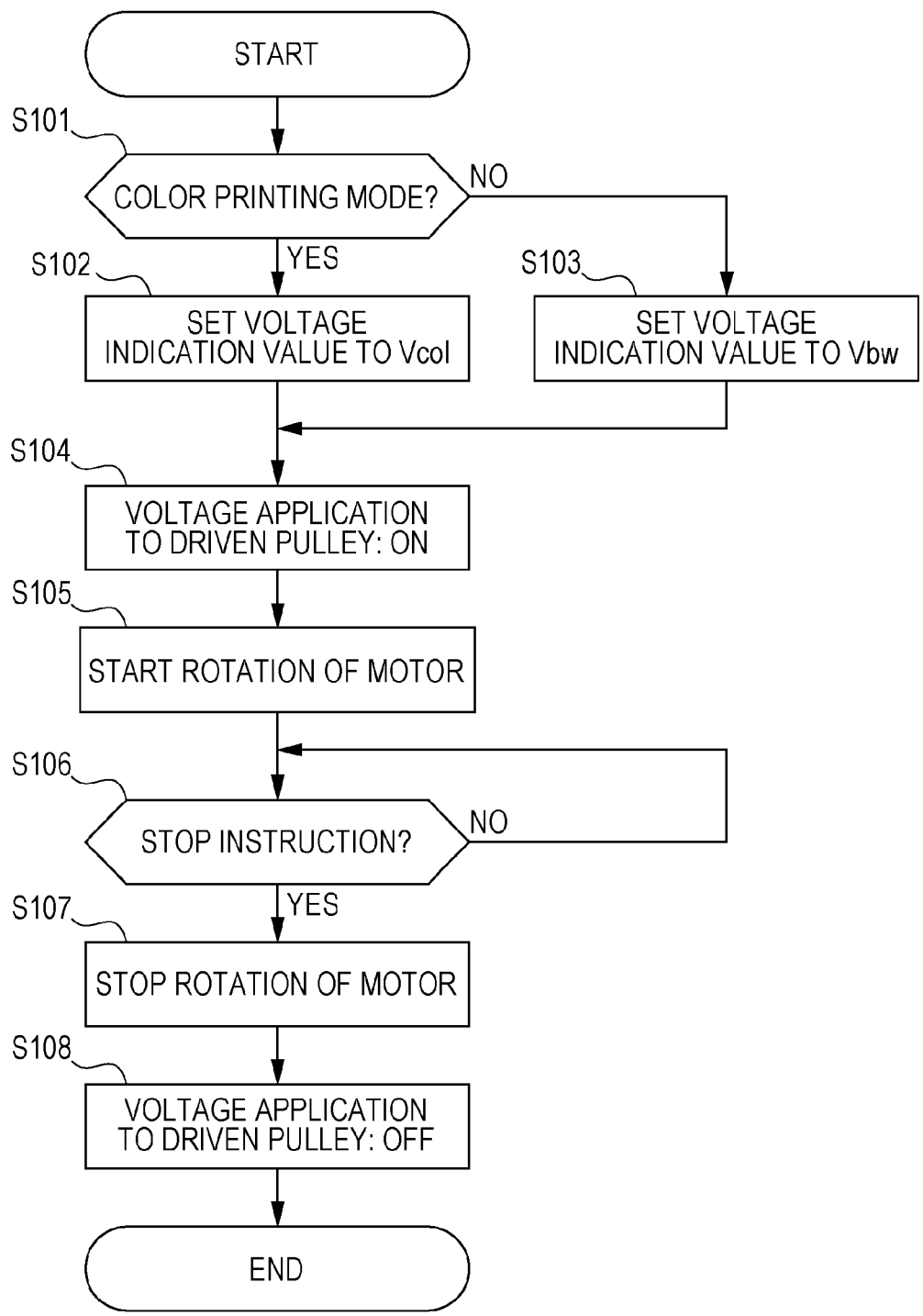
FIG. 9 is a flowchart of a process related to driving of a photosensitive drum.

FIG. 9 is a flowchart of a process related to driving of the photosensitive drum 1. Before the drive transmission device 50 starts an operation, voltage application to the driven pulley 22 is OFF. When an operation start instruction is issued from the CPU 110 to the drive transmission device 50, the process illustrated in FIG. 9 starts.

First, the voltage indication unit 25 determines, on the basis of received printing mode information, whether or not the printing mode is a color printing mode (step S101). In accordance with a result of the determination, when the printing mode is the color printing mode, the voltage indication unit 25 sets a voltage indication value to Vcol, which is a voltage value stored in advance for the color printing mode (step S102). In contrast, when the printing mode is not the color printing mode, the printing mode is a monochrome printing mode, and therefore the voltage indication unit 25 sets the voltage indication value to Vbw, which is a voltage value stored in advance for the monochrome printing mode (step S103).

In step S104, the voltage indication unit 25 outputs the set voltage indication value to the voltage application unit 24, and therefore the voltage application unit 24 applies the voltage corresponding to the voltage indication value to the driven pulley 22. Then, rotation of the motor 20 is started by a motor control unit, which is not illustrated (step S105).

After that, the voltage application unit 24 and the motor control unit mentioned above wait until a stop instruction has been issued from the CPU 110 (step S106). When a stop instruction is been issued, the motor control unit stops the rotation of the motor 20 (step S107), and then, the voltage application unit 24 turns off the voltage application to the driven pulley 22 (step S108). Then, the process illustrated in FIG. 9 ends.

Thus, in the drive transmission device 50, an appropriate electrostatic attraction force is generated which is in association with a change in load torque caused by a change in the number of the photosensitive drums 1 that are driven to rotate. Therefore, the driving force is transmitted without occurrence of slippage between the pulleys 21 and 22 and the belt 23.

As described with reference to FIG. 3, in the mechanism of drive transmission to the photosensitive drums 1Y to 1K, the drive transmission device 50 using the electrostatic attraction force is provided at a first stage of deceleration transmission of rotational driving force of the motor 20, and gears are used for the subsequent transmission. Vibration energy generally occurring at drive transmission using a gear can be expressed by Equation 6 as below.

$$E_G = 2 * \pi^2 * m_G * f_G^2 * A_G^2$$

In Equation 6, $E_G$ represents vibration energy occurring at a gear, $m_G$ represents the mass of a gear tooth, $f_G$ represents an engagement frequency, and $A_G$ represents an engagement transmission error amplitude. As can be seen from Equation 6, the vibration energy $E_G$ is proportional to the square of the engagement frequency $f_G$.

In the drive transmission to the photosensitive drums 1Y to 1K according to the first embodiment, the deceleration ratio of the drive transmission device 50 is set to 0.25, and the engagement frequency of a gear at the subsequent stage is one-quarter of the case used at the first stage. Accordingly, vibration energy occurring at the gear in the subsequent stage is one-sixteenth. Therefore, as in the first embodiment, even if the drive transmission device 50 which uses the electrostatic attraction force is provided only at the first stage of the transmission mechanism, a high level of vibration control and noise-reduction effects can be achieved. Moreover, in order to achieve further vibration control and noise-reduction effects, in place of the gear, a drive transmission device using the electrostatic attraction force may be used for the subsequent stage, as well as the first stage.

Figure 10:
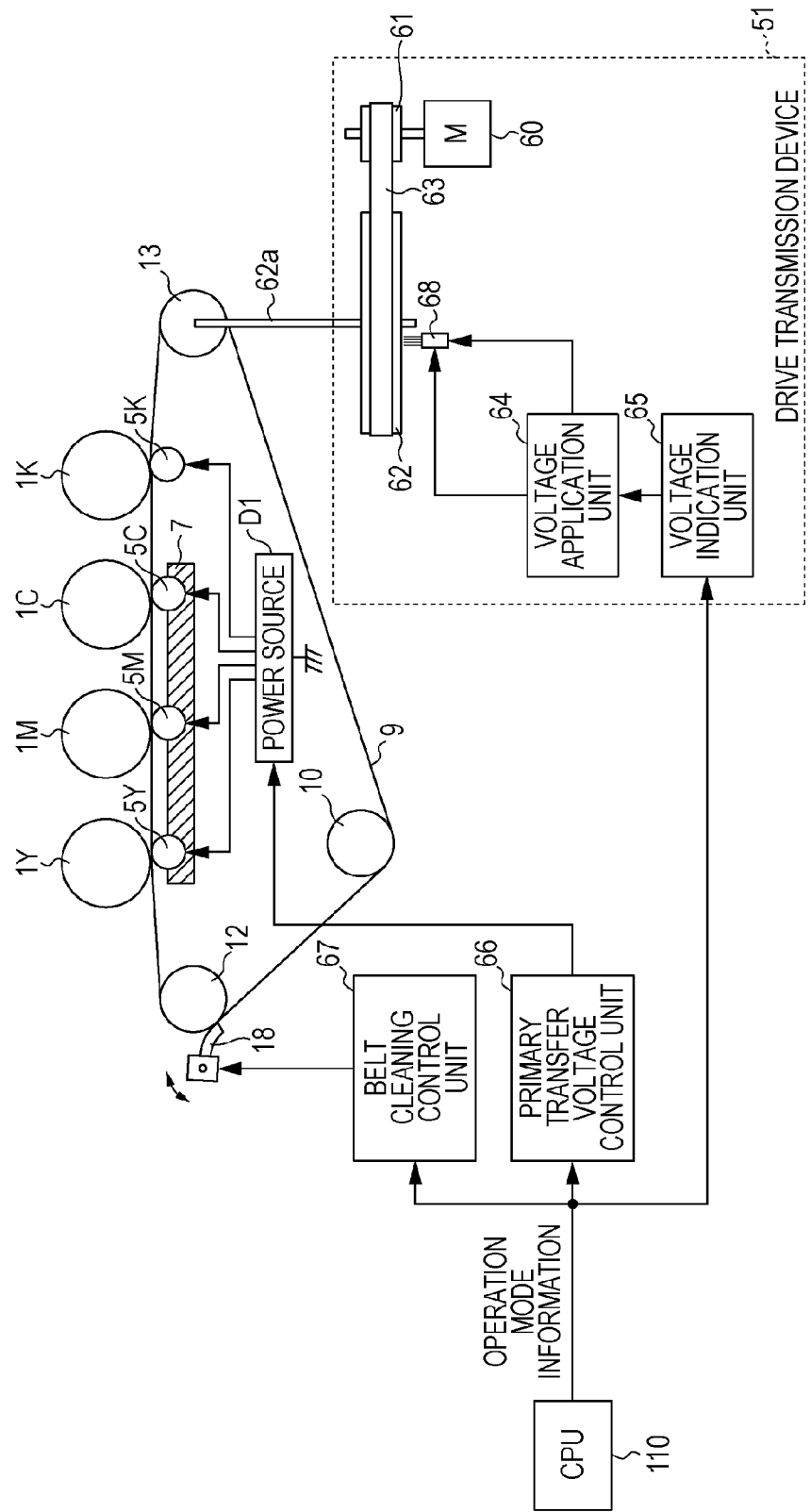
FIG. 10 is a schematic diagram illustrating a drive transmission device which transmits driving force to an intermediate transfer belt.

FIG. 10 is a schematic diagram illustrating a configuration of a drive transmission device 51 and its surroundings according to the second configuration example. In FIG. 10, the surroundings of the intermediate transfer belt 9 are illustrated in a cross-sectional view, while the drive transmission device 51 is simply illustrated in a plan view.

When comparing with the drive transmission device 50 (FIG. 3), the drive transmission device 51 includes a voltage indication unit 65, a voltage application unit 64, and the motor 60, which correspond to the voltage indication unit 25, the voltage application unit 24, and the motor 20, respectively. The drive transmission device 51 also includes a driving pulley 61, a driven pulley 62, a belt 63, and an electro-conductive brush 68, which correspond to the driving pulley 21, the driven pulley 22, the belt 23, and the electro-conductive brush 28, respectively.

The rotational driving force of the motor 60 is transmitted via the driving pulley 61, the belt 63, and the driven pulley 62 to the driving roller 13 connected to an output shaft 62a of the driven pulley 62. The intermediate transfer belt 9 is driven to rotate along with the rotation of the driving roller 13. To the driven pulley 62, a DC voltage is applied from the voltage application unit 64 via the electro-conductive brush 68. Due to the electrostatic attraction force generated between the pulleys 61 and 62 and the belt 63, the transmittable driving force increases.

A voltage value applied to the driven pulley 62 is determined by the voltage indication unit 65, and changed in association with variations of load torque of the intermediate transfer belt 9 which corresponds to an operation mode including the printing mode. As described in detail later, factors of variations in the load torque include contact/separation of a cleaning blade of the intermediate transfer belt cleaning device 18 (hereinafter, may also be abbreviated as a cleaning device 18) with/from the photosensitive drum 1. Another factor is contact/separation between the photosensitive drums 1Y, 1M, and 1C and the primary transfer rollers 5Y, 5M, and 5C, which are contact/separation members, via the intermediate transfer belt 9. Furthermore, presence or absence of a primary transfer voltage applied to the primary transfer rollers 5Y to 5K is also included as a factor.

As illustrated in FIG. 10, operation mode information as identification information is input from the CPU 110 to the voltage indication unit 65, a primary transfer voltage control unit 66, and a belt cleaning control unit 67. The operation mode information is information indicating whether the operation mode is the color printing mode, the monochrome printing mode, a laser beam quantity adjustment mode, or a transfer voltage adjustment mode. The belt cleaning control unit 67 controls, in accordance with the received operation mode information, contact/separation of (the cleaning blade of) the cleaning device 18 with/from the intermediate transfer belt 9.

Accordingly, the operation mode information is also information which indicates an in-contact or non-contact state of the primary transfer rollers 5Y, 5M and 5C or the cleaning blade of the cleaning device 18 with the intermediate transfer belt 9.

When the operation mode is the color printing mode or the monochrome printing mode, the belt cleaning control unit 67 brings the cleaning device 18 into contact with the intermediate transfer belt 9 to remove transfer residual toner. When the operation mode is the laser beam quantity adjustment mode or the transfer voltage adjustment mode, the belt cleaning control unit 67 separates the cleaning blade from the intermediate transfer belt 9 to minimize degradation of the intermediate transfer belt 9 caused by rubbing.

Here, the laser beam quantity adjustment mode and the transfer voltage adjustment mode will be briefly explained. The laser beam quantity adjustment mode is a mode in which laser beams to be applied to the photosensitive drum 1 are adjusted to an optimal quantity, and is executed when the power is turned on, every time when a predetermined number of sheets are printed, or every time when a predetermined time has passed. In this mode, the image forming apparatus 100 charges the photosensitive drum 1 to a predetermined potential, performs irradiation by changing the laser beam quantity, and measures the potential of a formed latent image using a potential sensor provided near the photosensitive drum. Based on the measurement result, a laser beam quantity is determined so that a desired contrast potential can be obtained.

The transfer voltage adjustment mode is a mode in which a voltage to be applied to the primary transfer rollers 5 is adjusted to an optimal voltage. Similarly to the laser beam quantity adjustment mode, the transfer voltage adjustment mode is executed when the power is turned on, every time when a predetermined number of sheets are printed, or every time when a predetermined time has passed. In this mode, the image forming apparatus 100 measures a flowing current while changing the voltage applied to the primary transfer rollers 5, and determines the applied voltage so that a predetermined target current flows.

No development operation is performed in the laser beam quantity adjustment mode or the transfer voltage adjustment mode, and a toner image is not transferred to the intermediate transfer belt 9. Therefore, (the cleaning blade of) the cleaning device 18 is separated from the intermediate transfer belt 9.

Thus, in accordance with the operation mode, the cleaning device 18 is in contact with or separated from the intermediate transfer belt 9. Since the cleaning device 18 is a friction load for rotational driving of the intermediate transfer belt 9, the contact/separation operation of the cleaning device 18 is a factor that changes the load torque of the intermediate transfer belt 9.

Next, operations of the primary transfer rollers 5Y to 5K will be described. The primary transfer rollers 5Y to 5K are driven to rotate along with the rotation of the intermediate transfer belt 9, when in contact with the intermediate transfer belt 9. As described above, in the color printing mode, the four primary transfer rollers 5Y to 5K are in contact with the intermediate transfer belt 9, while in the monochrome printing mode, only the primary transfer roller 5K is in contact with the intermediate transfer belt 9.

Application of a primary transfer voltage to the primary transfer roller 5 is controlled by the primary transfer voltage control unit 66. The primary transfer voltage control unit 66 controls application of the primary transfer voltage in accordance with operation mode information received from the CPU 110.

In the laser beam quantity adjustment mode, transfer of a toner image to the intermediate transfer belt 9 is not performed. Therefore, no primary transfer voltage is applied to the primary transfer rollers 5Y to 5K. In the transfer voltage adjustment mode, a primary transfer voltage is applied to all of the primary transfer rollers 5Y to 5K in accordance with an adjustment operation. In the color printing mode, a primary transfer voltage for transferring a toner image is applied to all of the primary transfer rollers 5Y to 5K. In the monochrome printing mode, a primary transfer voltage for transferring a toner image is applied to only the primary transfer roller 5K.

When a voltage is applied to the primary transfer rollers 5Y to 5K as engagement members which can be engaged with (in contact with) the intermediate transfer belt 9, electrostatic force acts between the photosensitive drums 1Y to 1K, the intermediate transfer belt 9, and the primary transfer rollers 5Y to 5K, and rolling friction (engagement friction force) is increased. Therefore, application of the primary transfer voltage to the primary transfer rollers 5Y to 5K is a factor that changes load torque of the intermediate transfer belt 9.

As explained above, load torque of the intermediate transfer belt 9 varies in accordance with the operation mode. Differences in the load torque of the intermediate transfer belt 9 among the four operation modes will be summarized below.

In the color printing mode, the cleaning device 18, the photosensitive drums 1Y to 1K, and the primary transfer rollers 5Y to 5K are in contact with the intermediate transfer belt 9, and a voltage is applied to the primary transfer rollers 5Y to 5K. Therefore, the load torque is the maximum. In the monochrome printing mode, the photosensitive drums 1Y to 1C and the primary transfer rollers 5Y to 5C are separated from the intermediate transfer belt 9, and therefore the load torque is decreased by that amount compared to the case of the color printing mode. In the transfer voltage adjustment mode, the cleaning device 18 is separated from the intermediate transfer belt 9, and therefore the load torque is decreased by that amount compared to the case of the color printing mode. In the laser beam quantity adjustment mode, the cleaning device 18 is separated from the intermediate transfer belt 9, and furthermore, no voltage is applied to the primary transfer rollers 5Y to 5K. Therefore, the load torque is decreased by that amount compared to the case of the color printing mode.

Thus, in order to cope with a change of the load torque of the intermediate transfer belt 9 in accordance with the operation state, operation mode information is input from the CPU 110 to the voltage indication unit 65, and based on the information, the voltage indication unit 65 determines the voltage indication value to be applied to the driven pulley 62. In each of the operation modes, the voltage value to be applied to the driven pulley 62 is stored in advance in the voltage indication unit 65. The voltage indication unit 65 outputs, as a voltage indication value, the voltage value in accordance with the received operation mode information to the voltage application unit 64. The output voltage indication value is input to the voltage application unit 64, and the voltage application unit 64 applies the voltage corresponding to the input voltage indication value to the driven pulley 62 via the electro-conductive brush 68.

Specific voltage values stored in the voltage indication unit 65 are, for example, 1,000 V for the color printing mode, 750 V for the monochrome printing mode, 850 V for the transfer voltage adjustment mode, and 650 V for the laser beam quantity adjustment mode.

Next, an operation flow of the drive transmission device 51 will be explained.

Figure 11:
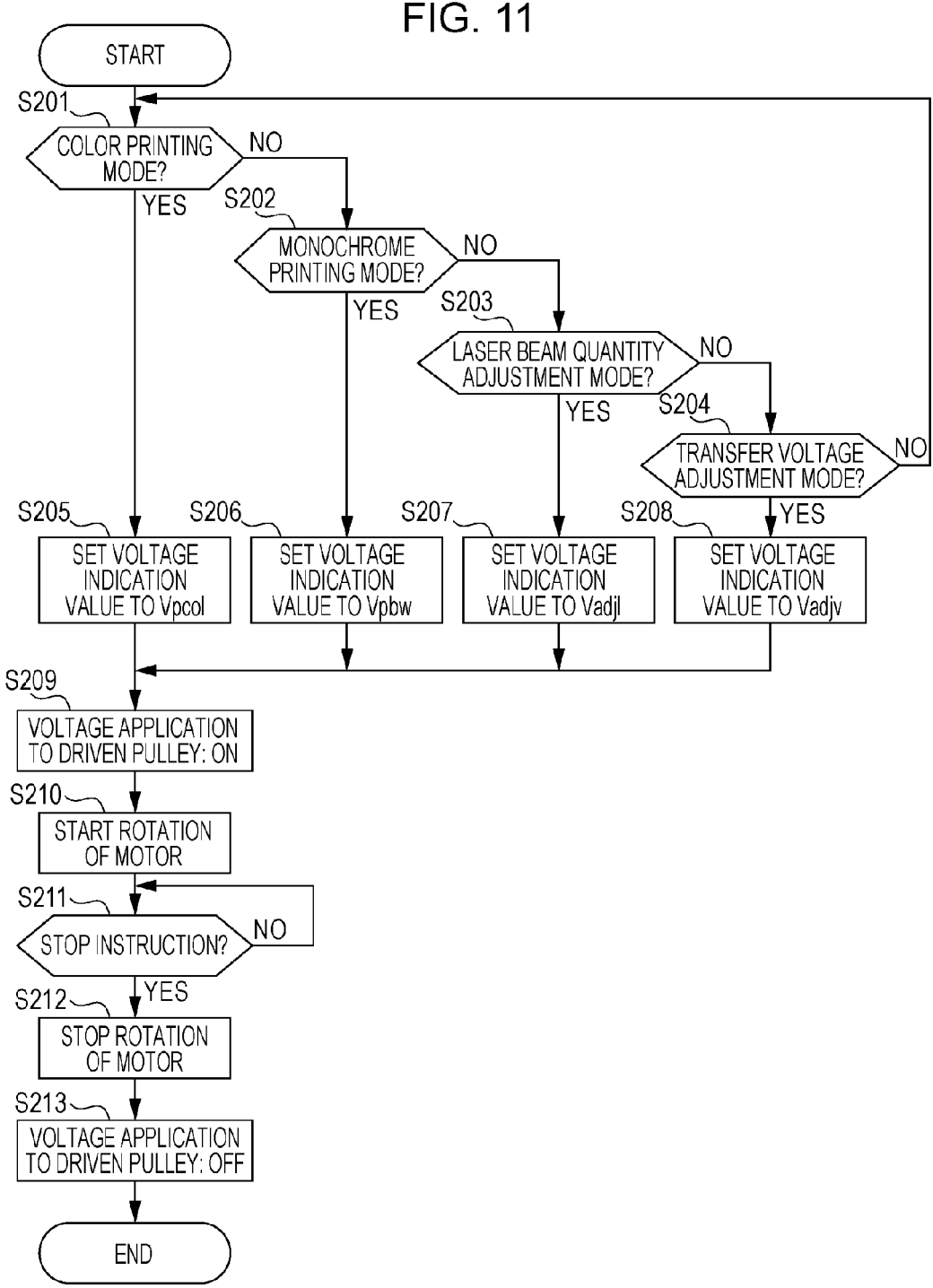
FIG. 11 is a flowchart of a process related to driving of an intermediate transfer belt.

FIG. 11 is a flowchart of a process related to driving of the intermediate transfer belt 9. Before the drive transmission device 51 starts an operation, voltage application to the driven pulley 62 is OFF. When an operation start instruction is issued from the CPU 110 to the drive transmission device 51, the process illustrated in FIG. 11 starts.

The voltage indication unit 65 determines an operation mode on the basis of received operation mode information (steps S201 to S204). When the operation mode is the color printing mode, the voltage indication unit 65 sets the voltage indication value to Vpcol (=1,000 V), which is an applied voltage stored in advance for the color operation mode (step S205). When the operation mode is the monochrome printing mode, the voltage indication unit 65 sets the voltage indication value to Vpbw (=750 V), which is an applied voltage stored in advance for the monochrome printing mode (step S206). When the operation mode is the laser beam quantity adjustment mode, the voltage indication unit 65 sets the voltage indication value to Vadjl (=650 V), which is an applied voltage stored in advance for the laser beam quantity adjustment mode (step S207). When the operation mode is the transfer voltage adjustment mode, the voltage indication unit 65 sets the voltage indication value to Vadjv (=850 V), which is an applied voltage stored in advance for the transfer voltage adjustment mode (step S208).

After the processing of steps S205 to S208, in step S209, the voltage indication unit 65 outputs the set voltage indication value to the voltage application unit 64, and therefore the voltage application unit 64 applies the voltage corresponding to the voltage indication value to the driven pulley 62. Furthermore, a motor control unit, which is not illustrated, starts to rotate the motor 60 (step S210).

After that, the voltage application unit 64 and the motor control unit mentioned above wait until a stop instruction has been issued from the CPU 110 (step S211). When a stop instruction is issued, the motor control unit stops the rotation of the motor 60 (step S212), and then, the voltage application unit 64 turns off the voltage application to the driven pulley 62 (step S213). After that, the process illustrated in FIG. 11 ends.

Thus, in the drive transmission device 51, an appropriate electrostatic attraction force is generated which is in association with contact/separation of a contact/separation member which rubs and slides against the driven unit and a change in load torque caused by an application state of a primary transfer voltage or the like. Therefore, the driving force is transmitted without occurrence of slippage between the pulleys 61 and 62 and the belt 63.

In the explanation provided above, the voltage applied to the driven pulley 62 is changed in accordance with the presence or absence of application of the primary transfer voltage to the primary transfer rollers 5Y to 5K. However, for finer control, the value of the voltage applied to the driven pulley 62 may be changed in accordance with the voltage value of the primary transfer voltage. In this case, the primary transfer voltage control unit 66 is configured to notify the voltage indication unit 65 of the voltage value of the primary transfer voltage. Furthermore, the voltage indication unit 65 may include a lookup table in which a voltage indication value to be applied to the driven pulley 62 is stored in association with the voltage value of the primary transfer voltage, and can therefore determine a voltage indication value to be applied, in accordance with the notified voltage value of the primary transfer voltage.

Figure 12:
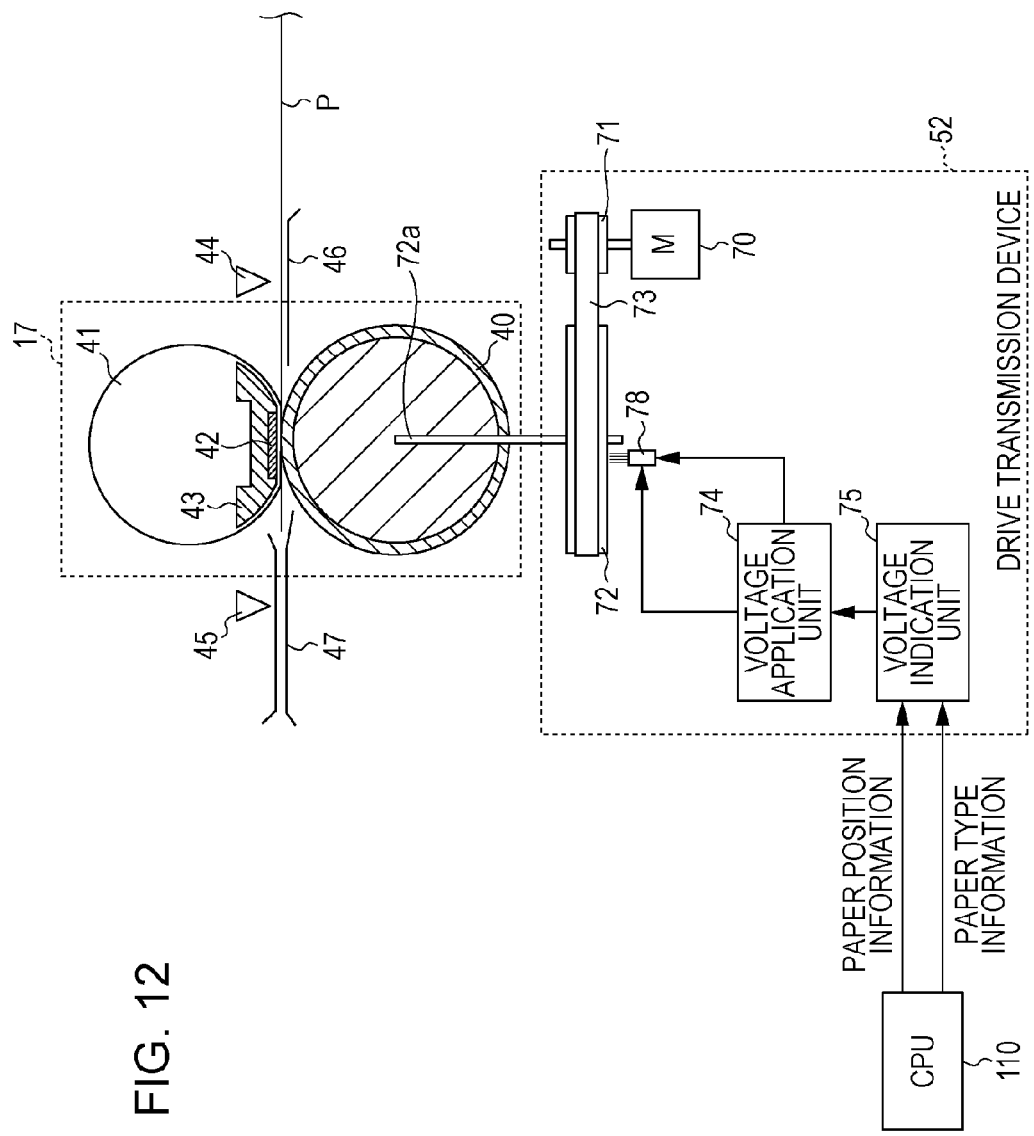
FIG. 12 is a schematic diagram illustrating a drive transmission device which transmits driving force to a pressure roller of a fixing unit.

FIG. 12 is a schematic diagram illustrating a configuration of a drive transmission device 52 and its surroundings according to the third configuration example. In FIG. 12, the surroundings of the fixing device 17 are illustrated in a cross-sectional view, while the drive transmission device 52 is simply illustrated in a plan view.

When comparing with the drive transmission device 50 (FIG. 3), the drive transmission device 52 includes a voltage indication unit 75, a voltage application unit 74, and a motor 70, which correspond to the voltage indication unit 25, the voltage application unit 24, and the motor 20, respectively. The drive transmission device 52 also includes a driving pulley 71, a driven pulley 72, a belt 73, and an electro-conductive brush 78, which correspond to the driving pulley 21, the driven pulley 22, the belt 23, and the electro-conductive brush 28, respectively.

The rotational driving force of the motor 70 is transmitted via the driving pulley 71, the belt 73, and the driven pulley 72, and the pressure roller 40 connected to an output shaft 72a of the driven pulley 72 is thus driven to rotate. To the driven pulley 72, a DC voltage is applied from the voltage application unit 74 via the electro-conductive brush 78. Due to the electrostatic attraction force generated between the pulleys 71 and 72 and the belt 73, the transmittable driving force increases.

A voltage value applied to the driven pulley 72 is determined by the voltage indication unit 75 and is changed in association with variations of the load torque of the pressure roller 40. As described in detail later, factors of variations in the load torque of the pressure roller 40 include the state of recording paper P being nipped or not being nipped at a fixing nip and the paper type and paper size of the recording paper P in the case where the recording paper P is nipped.

First, the configuration and operation of the fixing device 17 will be explained. As illustrated in FIG. 12, the fixing device 17 includes the pressure roller 40, a fixing film 41, a fixing heater 42, and a film guide 43, and the pressure roller 40 and the fixing film 41 form a fixing nip. The fixing heater 42 is held by the film guide 43 and heats the fixing film 41 from inside. The film guide 43 is pressurized toward the pressure roller 40 by a pressure spring, which is not illustrated.

The pressure roller 40 is driven to rotate by the driving force transmitted from the drive transmission device 52. Both ends of the fixing film 41 are held by a flange member, which is not illustrated. The fixing film 41 is driven to rotate while rubbing against between the flange member, the fixing heater 42, and the film guide 43 along with the rotation of the pressure roller 40.

The recording paper P, onto the surface of which a toner image is transferred from the intermediate transfer belt 9, is conveyed to the fixing nip along a fixation entrance guide 46, and pressurized and heated while being conveyed along with the rotation of the pressure roller 40. Thus, the toner image is fixed onto the surface of the recording paper P. The recording paper P to which the toner image has been fixed is ejected from the fixing device 17 along a fixation exit separation guide 47.

Before and after the fixing device 17, a fixation entrance sensor 44 and a fixation exit sensor 45 are provided for detecting whether or not the recording paper P is present on a conveyance path at the entrance and exit of the fixing device 17. Detection results of the fixation entrance sensor 44 and the fixation exit sensor 45 are reported to the CPU 110. The CPU 110 determines, on the basis of the detection results, the size of the recording paper P, and the conveyance speed, whether or not the recording paper P is being nipped at the fixing nip.

The load torque of the pressure roller 40 of the fixing device 17 which operates as described above varies according to whether or not the recording paper P is being nipped at the fixing nip. When the recording paper P is being nipped at the fixing nip, the load for conveying the recording paper P is applied. By further nipping the recording paper P, the nip pressure between the pressure roller 40 and the fixing film 41 increases. In accordance with the increase in the nip pressure, the normal force of a rubbing part increases, thereby the friction force being increased. Furthermore, the increase in the nip pressure causes the rolling friction and the friction force at the bearing part to be increased. Thus, when the recording paper P is being nipped at the fixing nip, the load torque of the pressure roller 40 increases. Furthermore, the thicker the recording paper P or the heavier the recording paper P, the greater the amount of increase in the load torque.

In order to cope with such variations of the load torque, the CPU 110 inputs paper position information and paper type information as identification information to the voltage indication unit 75. In accordance with the information, the voltage indication unit 75 determines a voltage indication value to be applied to the driven pulley 72.

The paper position information is information indicating whether or not the recording paper P is being nipped at the fixing nip, and is generated by the CPU 110 on the basis of detection results of the fixation entrance sensor 44 and the fixation exit sensor 45. The paper type information contains information of the paper size as well as the type of the recording paper P. The paper type information is determined based on printing settings, and is obtained by the CPU 110 when a print job starts.

A state from a point immediately before the recording paper P is nipped at the fixing nip to a point at which the recording paper P completely exits from the fixation nip is represented as a nip state. A voltage value for the case where the recording paper P is not nipped at the fixing nip is stored in advance in the voltage indication unit 75. Voltage values to be applied to the driven pulley 72 for the case where various types of recording paper are nipped are stored in advance for individual combinations of types and paper sizes of the recording paper P. The voltage indication unit 75 outputs a voltage indication value to the voltage application unit 74 in accordance with the received paper position information and paper type information.

The output voltage indication value is input to the voltage application unit 74. The voltage application unit 74 applies a voltage of the value corresponding to the received voltage indication value to the driven pulley 72 via the electro-conductive brush 78.

Next, an operation flow of the drive transmission device 52 will be explained.

Figure 13:
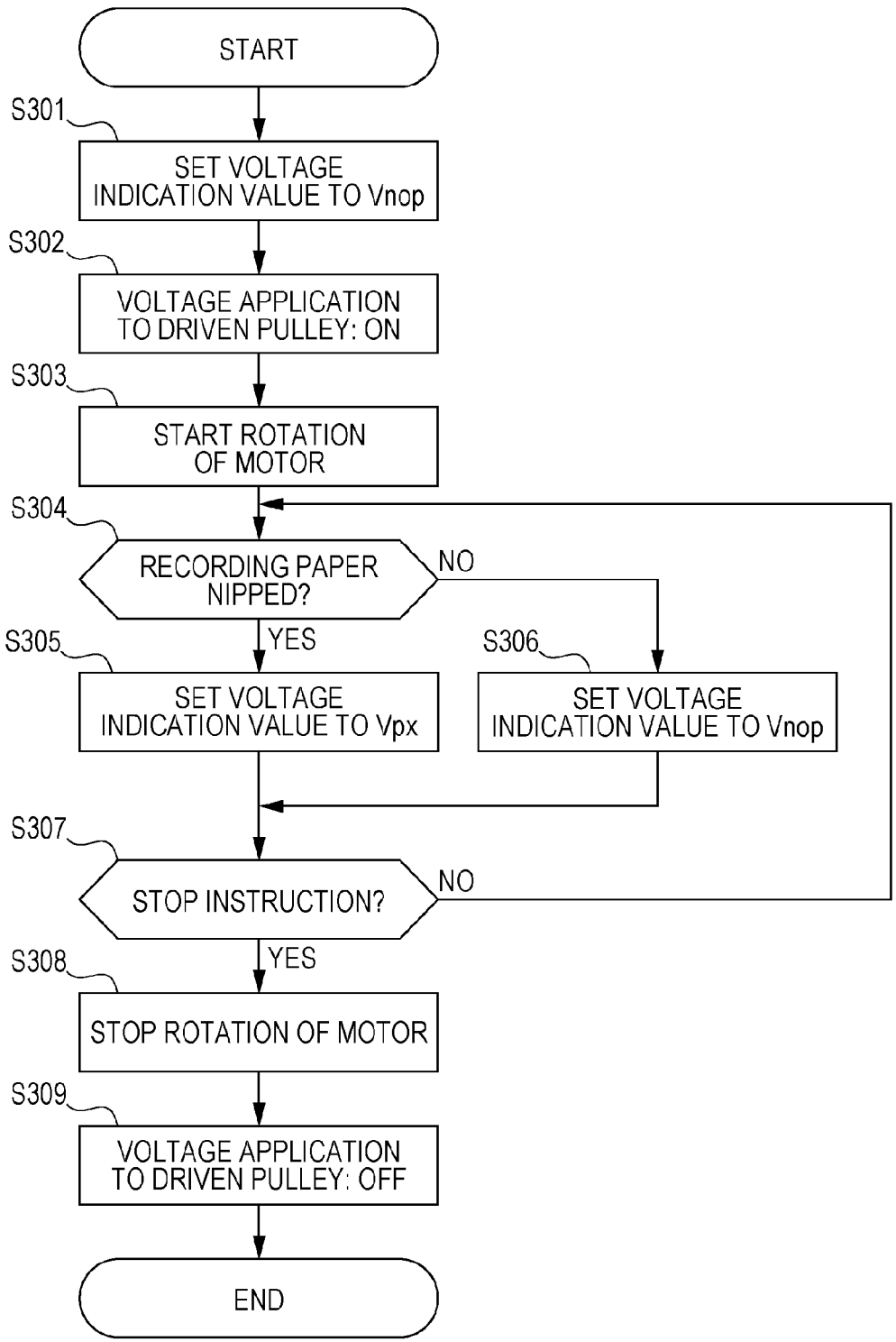
FIG. 13 is a flowchart of a process related to driving of a pressure roller.

FIG. 13 is a flowchart of a process related to driving of the pressure roller 40. Before the drive transmission device 52 starts an operation, voltage application to the driven pulley 72 is OFF. When an operation start instruction is issued from the CPU 110 to the drive transmission device 52, the process illustrated in FIG. 13 starts.

First, the voltage indication unit 75 sets the voltage indication value to Vnop, which is a voltage value stored in advance for the case where the recording paper P is not nipped at the fixing nip (step S301). Next, the voltage indication unit 75 outputs the set voltage indication value to the voltage application unit 74, and the voltage application unit 74 applies the voltage corresponding to the voltage indication value to the driven pulley 72. Furthermore, a motor control unit, which is not illustrated, starts to rotate the motor 70 (step S303).

Next, the voltage indication unit 75 determines, on the basis of paper position information received from the CPU 110, whether or not the recording paper P is being nipped at the fixing nip (step S304). In accordance with a result of the determination, when the recording paper P is being nipped at the fixing nip, the voltage indication unit 75 also refers to paper type information received from the CPU 110, and sets the voltage indication value to Vpx, which is a voltage value corresponding to the paper type information (step S305). The voltage value Vpx is a value corresponding to the combination of the type and paper size of the recording paper P.

In contrast, when the recording paper P is not being nipped at the fixing nip, the voltage indication unit 75 sets the voltage indication value to the voltage value Vnop (step S306). Since voltage application to the driven pulley 72 is turned on in step S302, if the voltage indication value is changed, the value of the voltage applied to the driven pulley 72 is changed in accordance with the change of the voltage indication value.

After that, the voltage application unit 74 and the motor control unit mentioned above determine whether or not a stop instruction has been issued from the CPU 110 (step S307). The processing of steps S304 to S307 is repeated until a stop instruction has been issued from the CPU 110. When a stop instruction is issued, the motor control unit stops the rotation of the motor 70 (step S308), and then the voltage application unit 74 turns off the voltage application to the driven pulley 72 (step S309). After that, the process illustrated in FIG. 13 ends.

Thus, in the drive transmission device 52, an appropriate electrostatic attraction force is generated which is in association with the load torque which varies according to the position in the conveyance direction and paper type of the recording paper P, which serves as a conveyed object. Therefore, the driving force is transmitted without occurrence of slippage between the pulleys 71 and 72 and the belt 73.

As described above, the drive transmission devices 50, 51, and 52 recognize variations of the rotation load at the driven unit of the image forming apparatus 100 on the basis of identification information for identifying the operation state of the driven unit. In order to generate an appropriate electrostatic attraction force, the voltage indication units 25, 65, and 75 determine voltage values to be indicated to the voltage application units 24, 64, and 74 in accordance with recognized variations of the rotation load.

Therefore, according to the first embodiment, slippage between a pulley and a belt can be appropriately suppressed by efficiently generating necessary friction force without performing excessive voltage application, and the rotary force of a driving pulley can be transmitted to a driven pulley with high accuracy. Accordingly, a reduction of dust adhesion caused by application of high voltage, a reduction of the possibility of occurrence of electric discharge, and a reduction of power consumption can be achieved.

A drive transmission device does not necessarily have one of the configurations explained as the three configuration examples, and different configurations are also possible. For example, a configuration in which voltage is applied to a driving pulley and a driven pulley is grounded, a configuration in which voltage is applied to both the driving pulley and driven pulley and a belt is grounded, and a configuration in which a potential difference is provided between a pulley and a belt to cause electrostatic attraction force, are also possible.

A non-conductive part (a resin part etc.) may exist in part of each of a belt, a driving pulley, and a driven pulley, unless it blocks electrical connection. Furthermore, connection between a driven unit and a driven pulley and connection between a driving source and a driving pulley are not necessarily direct connection but may be indirect connection.

A single belt may be wound around two or more driven pulleys. Furthermore, some of a plurality of pulleys around which the belt 23 is wound may be wrapped outside the ring shape of the belt.

A dielectric layer is provided on the inner periphery of a belt in the above examples. However, a belt may include only a metal layer and a dielectric layer may be provided on the outer periphery of a pulley. Alternatively, dielectric layers may be provided at both a pulley and a belt. Therefore, in a region where a belt is wound around a pulley, a dielectric layer may be interposed between a conductive part (metal layer part etc.) of the belt and a conductive part of the pulley. In the case where three or more pulleys are provided, some of the pulleys may be arranged outside the ring shape of a belt. Therefore, a configuration in which a dielectric layer is provided outside the ring shape of a belt is also possible.

A belt used in a drive transmission device is, for example, a flat belt. However, the belt may be a different type, such as a V belt or a V-ribbed belt, as long as it is configured to be capable of friction transmission to and from a pulley.

In the first embodiment, the voltage indication units 25, 65, and 75 control determination and outputting of voltage values at the drive transmission devices 50, 51, and 52. However, the image forming apparatus 100 may include a control unit which concurrently controls determination and outputting of voltage values at the drive transmission devices 50, 51, and 52 in a comprehensive manner. This control unit may be provided in any one of the drive transmission devices 50, 51, and 52.

According to the first embodiment of the present invention, the power consumed by a drive transmission device for transmitting driving force can be reduced while generating friction force necessary for transmission of the driving force.

Second Embodiment

Figure 14:
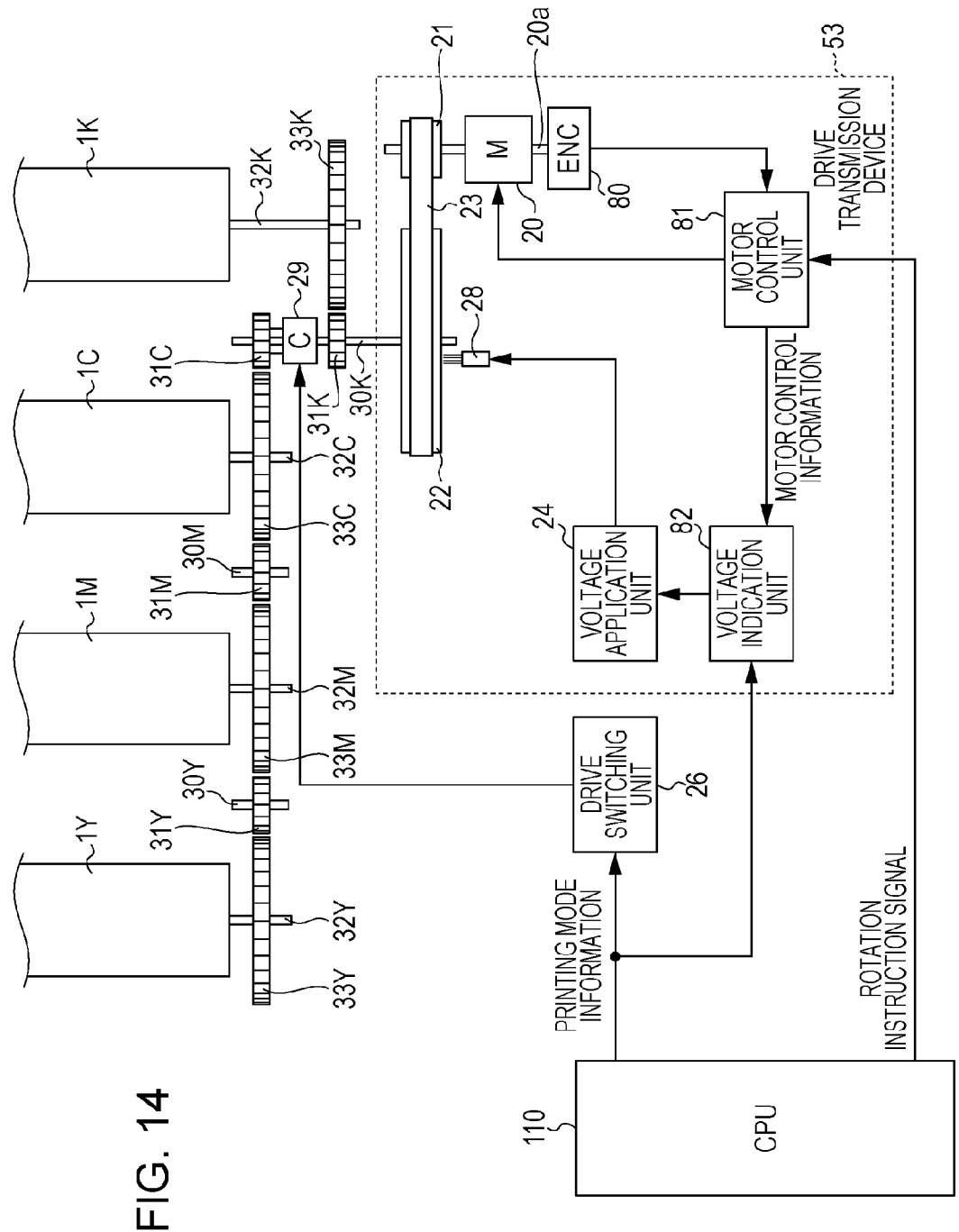
FIG. 14 is a schematic diagram illustrating a drive transmission device which transmits driving force to a photosensitive drum.

FIG. 14 is a schematic diagram illustrating a configuration of a drive transmission device and its surroundings according to a second embodiment of the present invention. In FIG. 14, a configuration to which the photosensitive drum 1 is applied as a driven unit, as in the first example of the first embodiment, is illustrated. However, as in the second example or the third example of the first embodiment, an example in which the driving roller 13 or the pressure roller 40 is used as a driven unit, may also be applied to the second embodiment.

In the second embodiment, identification information includes motor control information for controlling the motor 20, as well as printing mode information. The second embodiment is different from the first embodiment mainly in a method for determining a voltage value applied to the driven pulley 22, and detailed explanation for parts which are not different between the first embodiment and the second embodiment will be omitted.

When comparing with the drive transmission device 50 illustrated in FIG. 3, a drive transmission device 53 illustrated in FIG. 14 includes a voltage indication unit 82, in place of the voltage indication unit 25. The drive transmission device 53 also includes a motor control unit 81 and a rotation angle detection unit (ENC) 80. The rotation angle detection unit 80 is attached at the output shaft 20a of the motor 20. The CPU 110 outputs a rotation instruction signal as well as printing mode information. The rotation instruction signal is input to the motor control unit 81. The motor control unit 81 inputs motor control information to the voltage indication unit 82.

Figure 15:
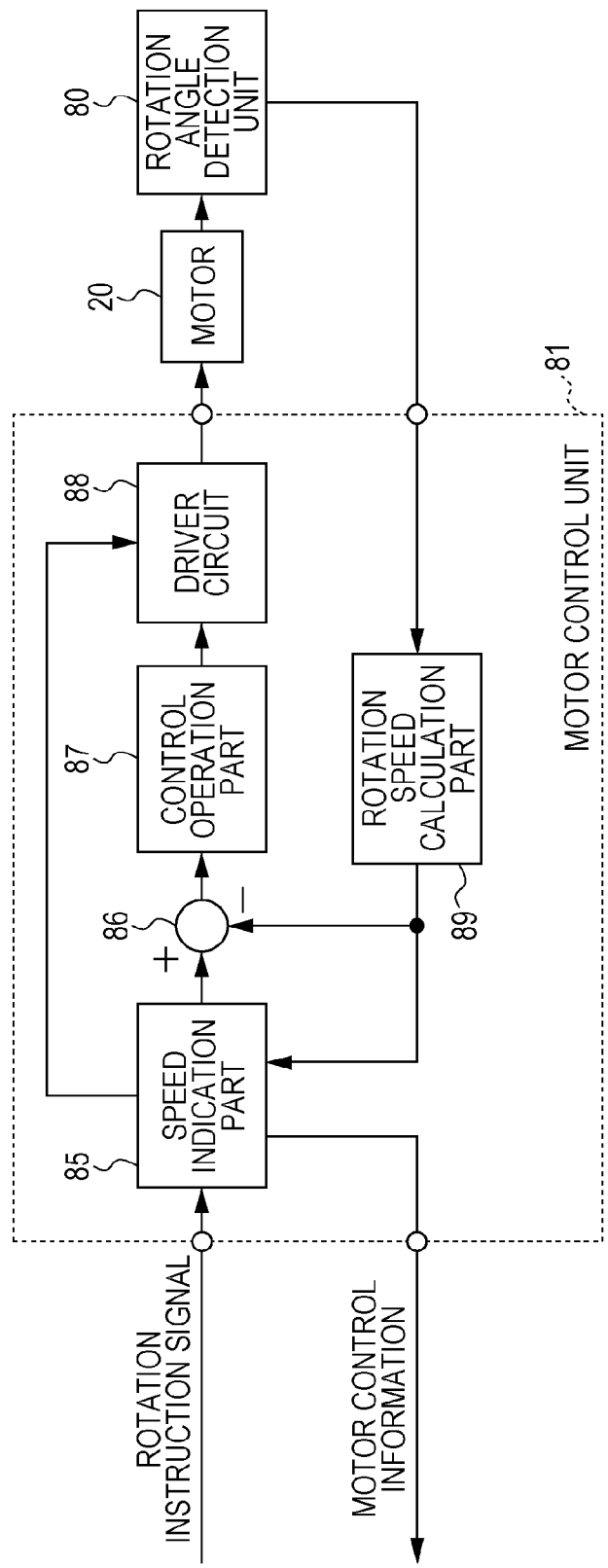
FIG. 15 is a schematic configuration diagram of a motor control unit.

FIG. 15 is a diagram illustrating an internal configuration of the motor control unit 81.

The motor control unit 81 supplies a driving current to the motor 20 in accordance with output from the rotation angle detection unit 80 and controls the rotation of the motor 20. The rotation angle detection unit 80 outputs a pulse signal every time the motor 20 rotates at a certain angle. In the motor control unit 81, a rotation speed calculation part 89 measures the cycle of pulse signals output from the rotation angle detection unit 80 to calculate the rotation speed of the motor 20, and outputs information of the rotation speed. In accordance with a rotation instruction signal received from the CPU 110, a speed indication part 85 outputs a speed indication value. A subtractor 86 calculates a difference between the speed indication value and the rotation speed as a speed deviation, and inputs the speed deviation to a control operation part 87.

The control operation part 87 performs control arithmetic operation on the received speed deviation under PI (proportional integral) control to obtain a torque designation value, and outputs the obtained torque designation value. A driver circuit 88 supplies a driving current corresponding to the torque designation value output from the control operation part 87, in synchronization with the rotation of the motor 20.

When a rotation instruction signal for requesting start of rotation of the motor 20 is received from the CPU 110, the motor control unit 81 first starts an acceleration operation. The speed indication part 85 gradually increases the speed indication value to be output from 0, in accordance with an acceleration set in advance. In accordance with the operation of the motor control unit 81 described above, the motor 20 accelerates accordingly to the increase in the speed indication value. When the speed indication value, which has been gradually increased, has become equal to a preset target rotation speed, the speed indication part 85 stops causing the speed indication value to increase, and proceeds to a speed maintenance operation. The speed indication part 85 continues to output the target rotation speed as a speed indication value, and the motor 20 constantly rotates at the target rotation speed.

Furthermore, when a rotation instruction signal for requesting stoppage of the rotation of the motor 20 is received from the CPU 110, the motor control unit 81 proceeds to a deceleration operation. The speed indication part 85 reduces the speed indication value to 0 and outputs a rotation stop instruction to the driver circuit 88. When a rotation stop instruction is received, the driver circuit 88 stops supply of the driving current to the motor 20, and causes a portion between coil terminals of the motor 20 to be short-circuited. When the portion between coil terminals is short-circuited, the motor 20 enters a so-called short-circuit braking operation state. Thus, braking force occurs, and the motor 20 decelerates and stops.

As described above, the motor control unit 81 performs feedback control so that the speed deviation input to the control operation part 87 decreases in accordance with the received rotation instruction signal.

The voltage indication unit 82 illustrated in FIG. 14 determines a voltage value to be applied to the driven pulley 22, in accordance with printing mode information received from the CPU 110 and motor control information received from the motor control unit 81. The applied voltage value changes in accordance with printing mode information, as described in the first embodiment. In the explanation provided below, as a representative example, a change in the applied voltage value according to motor control information in the case where the printing mode is the color operation mode, will be explained.

When the printing mode is the monochrome printing mode, the applied voltage value is changed from a value for the color printing mode into a value for the monochrome printing mode. However, operations similar to those in the color operation mode are performed.

In general, a driving force corresponding to the rotation load caused by friction force or the like which acts on a driven unit is necessary to drive the driven unit to rotate at a constant speed. Furthermore, in order to achieve acceleration or deceleration, a driving force corresponding to the acceleration/deceleration torque represented by the product of the moment of inertia and angular acceleration of the driven unit, as well as the above-mentioned driving force, is further required.

Therefore, even in the drive transmission device 53 according to the second embodiment, transmitted driving forces are different among an acceleration operation, a speed maintenance operation, and a deceleration operation of the motor 20, and voltage values required to be applied to the driven pulley 22 are also different among these operations. Thus, in the voltage indication unit 82, voltage values to be applied to the driven pulley 22 are stored in advance in association with the acceleration operation, the speed maintenance operation, and the deceleration operation. A voltage of a value corresponding to the motor control information received from the motor control unit 81 is output as a voltage indication value.

As specific voltage values, for example, a voltage value Va for an acceleration operation is 650 V, a voltage value Vc for a speed maintenance operation is 450 V, and a voltage value Vd for a deceleration operation is 800 V. The applied voltage value for the deceleration operation is larger than the applied voltage value for the acceleration operation because the absolute value of the angular acceleration in the deceleration operation is larger than that in the acceleration operation. Voltage values for the monochrome printing mode corresponding to the voltage values Va, Vc, and Vd are also stored in advance.

Next, an operation flow of the drive transmission device 53 will be explained. In the second embodiment, in place of FIG. 9 which is used for the explanation of the first embodiment, FIG. 16 will be used.

Figure 16:
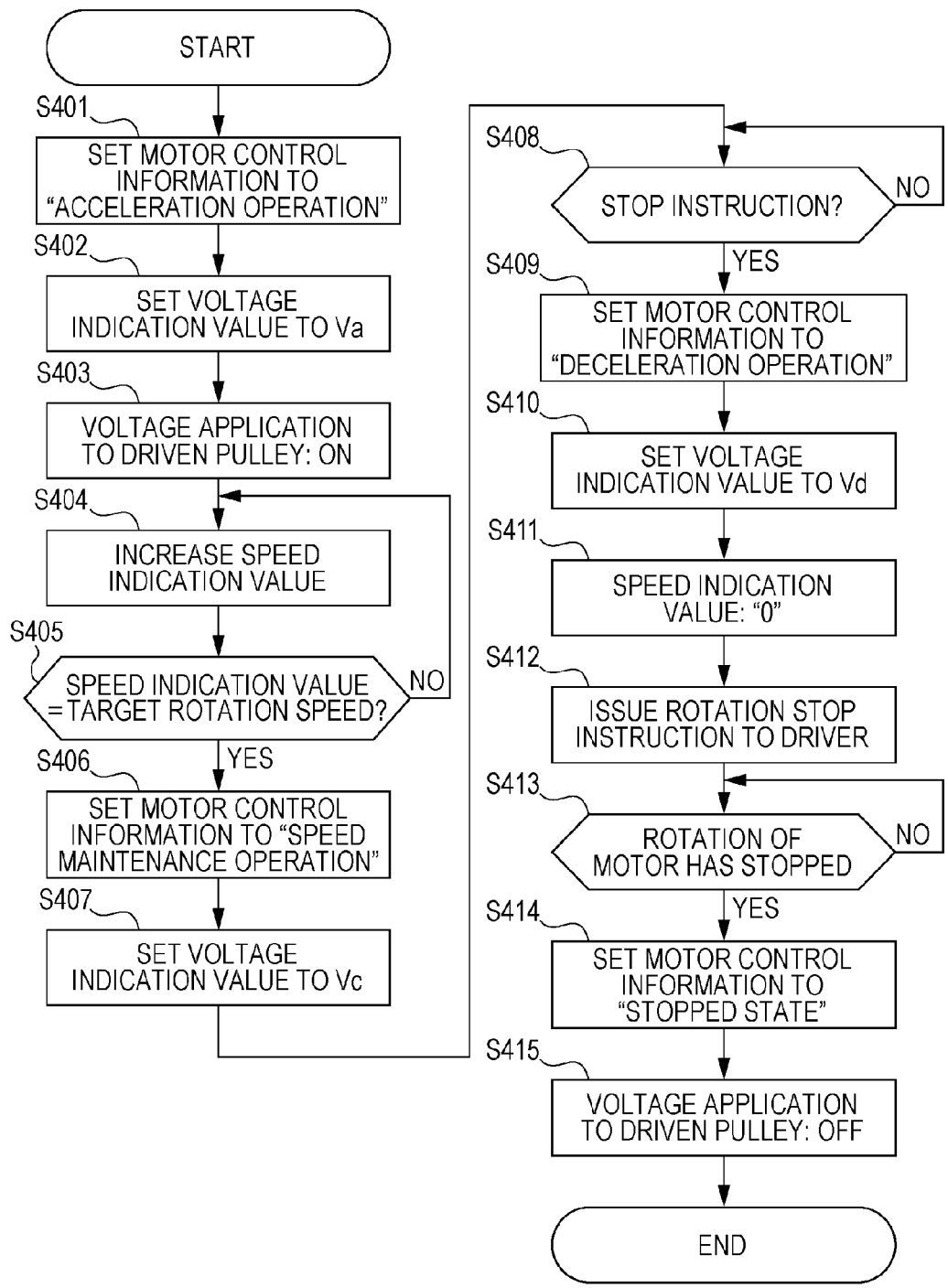
FIG. 16 is a flowchart of a process in a color printing mode related to driving of a photosensitive drum.

FIG. 16 is a flowchart of a process in the color printing mode related to driving of the photosensitive drum 1.

Before the motor 20 rotates, motor control information input from the speed indication part 85 of the motor control unit 81 to the voltage indication unit 82 indicates "stopped state", and the voltage application to the driven pulley 22 is OFF.

When a rotation instruction signal for requesting start of rotation of the motor 20 is received from the CPU 110, the speed indication part 85 sets motor control information to be output to the voltage indication unit 82 to "acceleration operation" (step S401). When the motor control information is set to "acceleration operation", the voltage indication unit 82 sets the voltage indication value to the voltage value Va stored in advance for the acceleration operation, and outputs the voltage indication value to the voltage application unit 24 (step S402). In accordance with the voltage indication value, the voltage application unit 24 applies the voltage of the voltage value Va to the driven pulley 22 via the electro-conductive brush 28 (step S403). After that, the speed indication part 85 gradually increases the speed indication value from 0 as described above (step S404), and the motor 20 performs an acceleration operation.

The speed indication part 85 compares the current speed indication value with a target rotation speed, and determines whether or not the current speed indication value is equal to the target rotation speed (step S405). When the current speed indication value is not equal to the target rotation speed, the process returns to step S404. When the current speed indication value is equal to the target rotation value, the speed indication part 85 ends the increase of the speed indication value, and sets the motor control information to "speed maintenance operation" while continuously outputting the target rotation speed as the speed indication value (step S406).

When the motor control information is set to the "speed maintenance operation", the voltage indication unit 82 sets the voltage indication value to the voltage value Vc stored in advance for the speed maintenance operation, and outputs the voltage indication value to the voltage application unit 24 (step S407). In accordance with the voltage indication value, the value of the applied voltage to the driven pulley 22 by the voltage application unit 24 is changed to the voltage value Vc.

After that, the drive transmission device 53 waits until a rotation instruction signal for requesting stoppage of the rotation of the motor 20 has been issued (step S408). When a stop instruction is issued, the speed indication part 85 sets the motor control information to "deceleration operation" (step S409). When the motor control information is set to "deceleration operation", the voltage indication unit 82 sets the voltage indication value to the voltage value Vd stored in advance for the deceleration operation, and outputs the voltage indication value to the voltage application unit 24 (step S410). In accordance with the voltage indication value, the value of the applied voltage to the driven pulley 22 by the voltage application unit 24 is changed to the voltage value Vd.

After that, as described above, the speed indication part 85 reduces the speed indication value to 0 (step S411), and outputs a rotation stop instruction to the driver circuit 88 (step S412). Next, the speed indication part 85 observes information of the rotation speed received from the rotation speed calculation part 89, and determines, based on the rotation speed, whether or not the motor 20 has stopped (step S413). That is, at the point in time when the rotation speed becomes approximately 0 (for example, a value less than or equal to a threshold), the speed indication part 85 determines that the motor 20 has stopped.

When it is determined that the motor 20 has stopped, the speed indication part 85 sets the motor control information to "stopped state" (step S414). When the motor control information is set to the "stopped state", the voltage indication unit 82 instructs the voltage application unit 24 to turn off the voltage application, and therefore the voltage application to the driven pulley 22 by the voltage application unit 24 is stopped (step S415). After that, the process illustrated in FIG. 16 ends.

As explained above, the drive transmission device 53 recognizes, on the basis of motor control information, a change in the necessary driving force generated in accordance with the operation state of the motor 20. In order to generate an appropriate electrostatic attraction force corresponding to the recognized change, the drive transmission device 53 determines a voltage value to be indicated to the voltage application unit 24.

Therefore, according to the second embodiment, regarding appropriately suppressing slippage between a pulley and a belt by efficiently generating necessary friction force without performing excessive voltage application, effects similar to those in the first embodiment can be achieved.

In the second embodiment, the motor 20 decelerates by using short-circuit braking which causes a portion between coil terminals to be in a short-circuited state. However, the deceleration of the motor 20 is not limited to this, and a deceleration operation may be performed in a different method. Specifically, as in the acceleration operation, by decreasing a speed indication value in accordance with a predetermined acceleration, the motor 20 may be decelerated while speed control being performed. Alternatively, the motor 20 may be decelerated by releasing a portion between coil terminals of the motor 20 and using friction force which acts on the photosensitive drum 1, the bearing, and the like, as decelerating force. In these cases, by storing in advance voltage values to be applied to the driven pulley 22 in a deceleration operation in the individual methods, deceleration may be achieved in a similar manner.

Furthermore, plural acceleration operation modes and deceleration operation modes having different accelerations may be provided. In such a case, for individual operations, voltage values to be applied to the driven pulley 22 may be stored in advance. Alternatively, by storing the moment of inertia of a driven unit, a voltage value to be applied to the driven pulley 22 may be calculated on the basis of the angular acceleration for an acceleration operation and a deceleration operation.

According to the second embodiment of the present invention, the power consumed by the drive transmission device for transmitting driving force can be reduced while generating friction force necessary for transmission of the driving force.

Third Embodiment

Figure 17:
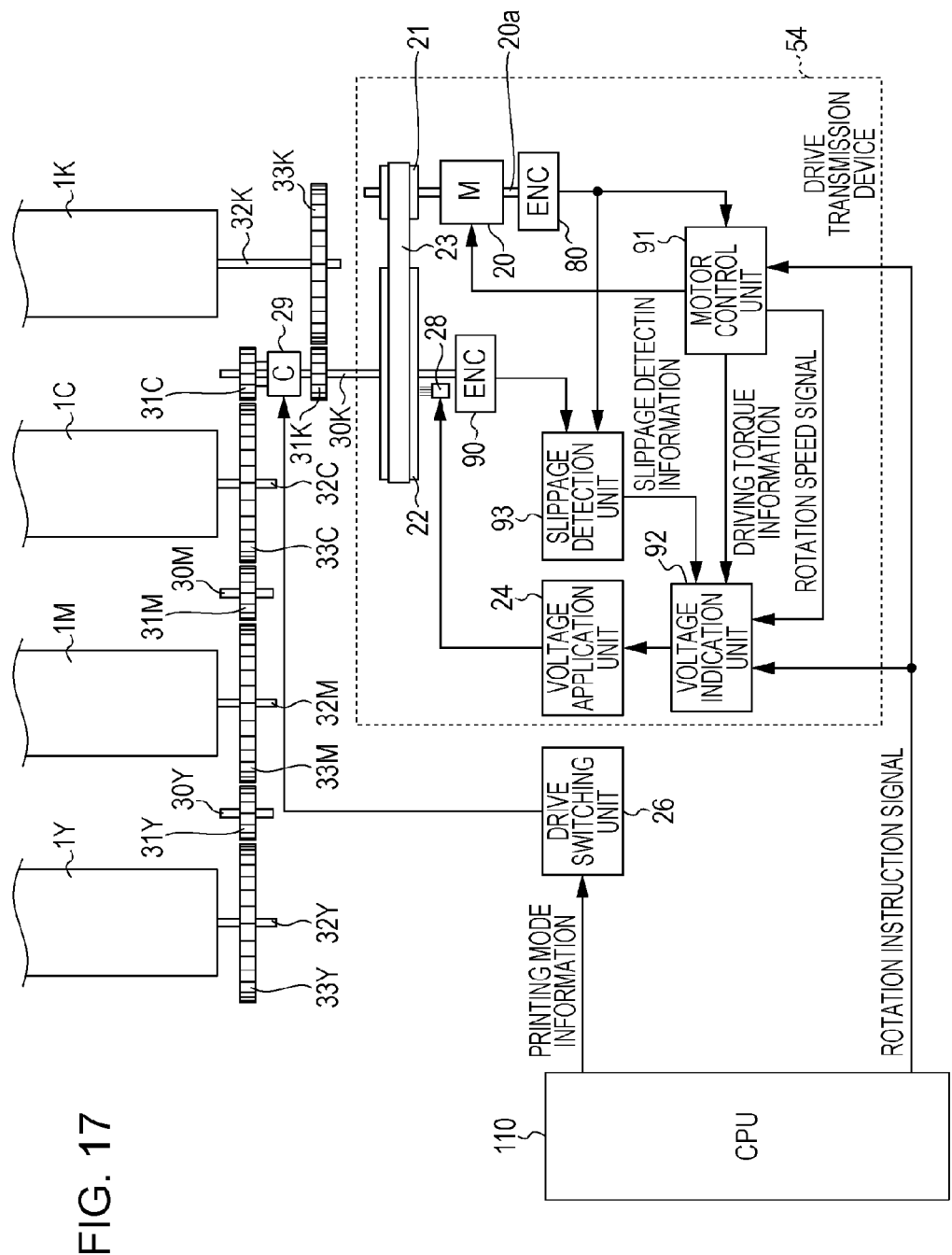
FIG. 17 is a schematic diagram illustrating a drive transmission device which transmits driving force to a photosensitive drum.

FIG. 17 is a schematic diagram illustrating a configuration of a drive transmission device and its surroundings according to a third embodiment of the present invention. In FIG. 17, a configuration to which the photosensitive drum 1 is applied as a driven unit, as in the second embodiment, is illustrated. However, as in the second example or the third example of the first embodiment, an example in which the driving roller 13 or the pressure roller 40 is used as a driven unit, may also be applied to the third embodiment.

In the third embodiment, driving torque information corresponds to identification information. The third embodiment is different from the second embodiment mainly in a method for determining a voltage value to be applied to the driven pulley 22, and detailed explanation for parts which are not different between the second embodiment and the third embodiment will be omitted.

When comparing with the drive transmission device 53 illustrated in FIG. 14, a drive transmission device 54 illustrated in FIG. 17 includes a voltage indication unit 92 and a motor control unit 91, in place of the voltage indication unit 82 and the motor control unit 81. The drive transmission device 54 also includes a slippage detection unit 93 and a rotation angle detection unit (ENC) 90. A rotation instruction signal from the CPU 110 is input to the voltage indication unit 92 and the motor control unit 91. The motor control unit 91 inputs a rotation speed signal and driving torque information to the voltage indication unit 92. The slippage detection unit 93 inputs slippage detection information to the voltage indication unit 92.

The voltage indication unit 92 illustrated in FIG. 17 determines a voltage value to be applied to the driven pulley 22, in accordance with driving torque information received from the motor control unit 91 and slippage detection information received from the slippage detection unit 93.

The drive transmission device 54 transmits rotational driving force of the motor 20, which serves as a driving source, to the photosensitive drums 1Y to 1K, which serve as a driven unit. Therefore, it may be considered that the driving force to be transmitted is equivalent to the driving force generated at the motor 20. Thus, the drive transmission device 54 is configured to set the value of a voltage to be applied to the driven pulley 22, in accordance with driving torque information output from the motor control unit 91.

Here, the driving torque information is information indicating the driving force generated at the motor 20 and indicating the load to be applied on the motor 20, which serves as a driving source. In general, driving torque generated at a motor is proportional to a current value flowing in a coil of the motor. Therefore, in the third embodiment, a current value detected at the motor control unit 91 is used as driving torque information.

Figure 18:
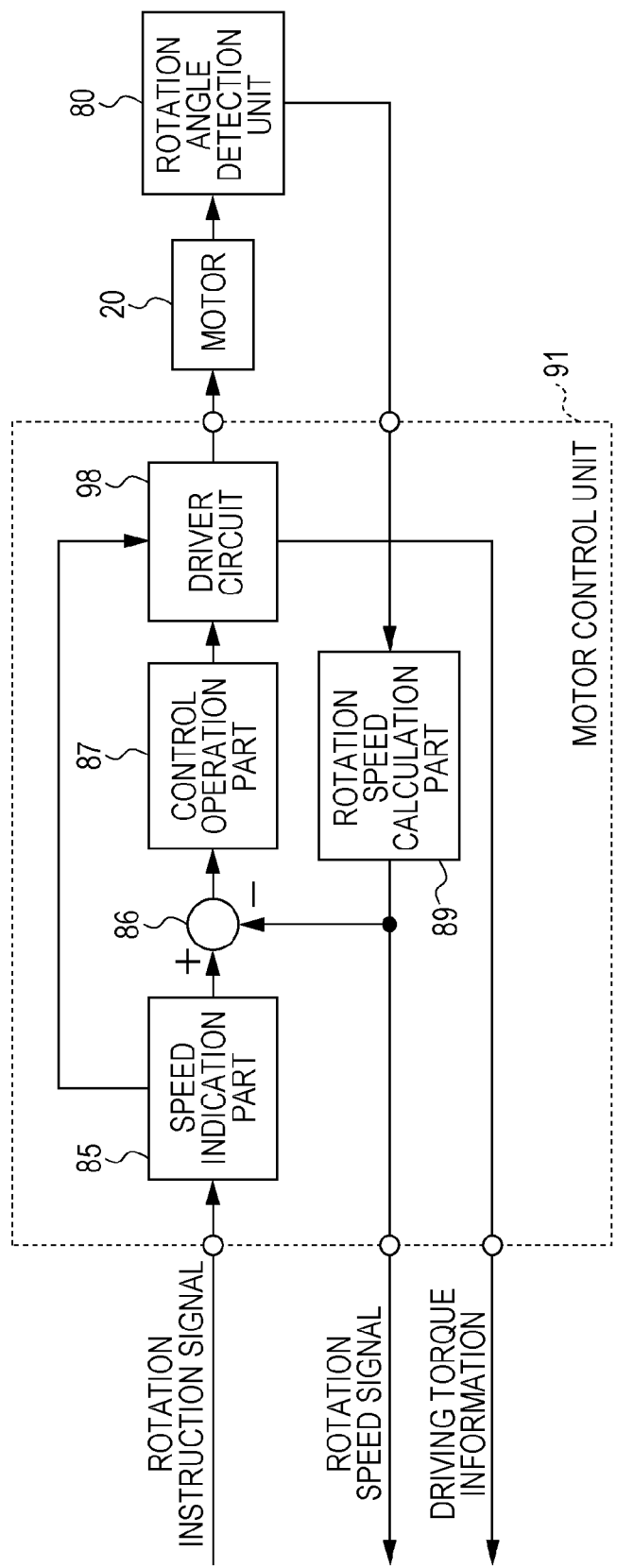
FIG. 18 is a schematic configuration diagram of a motor control unit.

Detection of current will be explained below with reference to FIGS. 18 and 19. FIG. 18 is a diagram illustrating an internal configuration of the motor control unit 91. Compared to the motor control unit 81 (FIG. 15) according to the second embodiment, the motor control unit 91 includes a driver circuit 98, in place of the driver circuit 88. The other features of the configuration are similar to those of the motor control unit 81.

The rotation control for the motor 20 is performed similarly to the motor control unit 81 (FIG. 15). Detection of current is performed at the driver circuit 98, and a detection result is output as driving torque information from the driver circuit 98.

Figure 19:
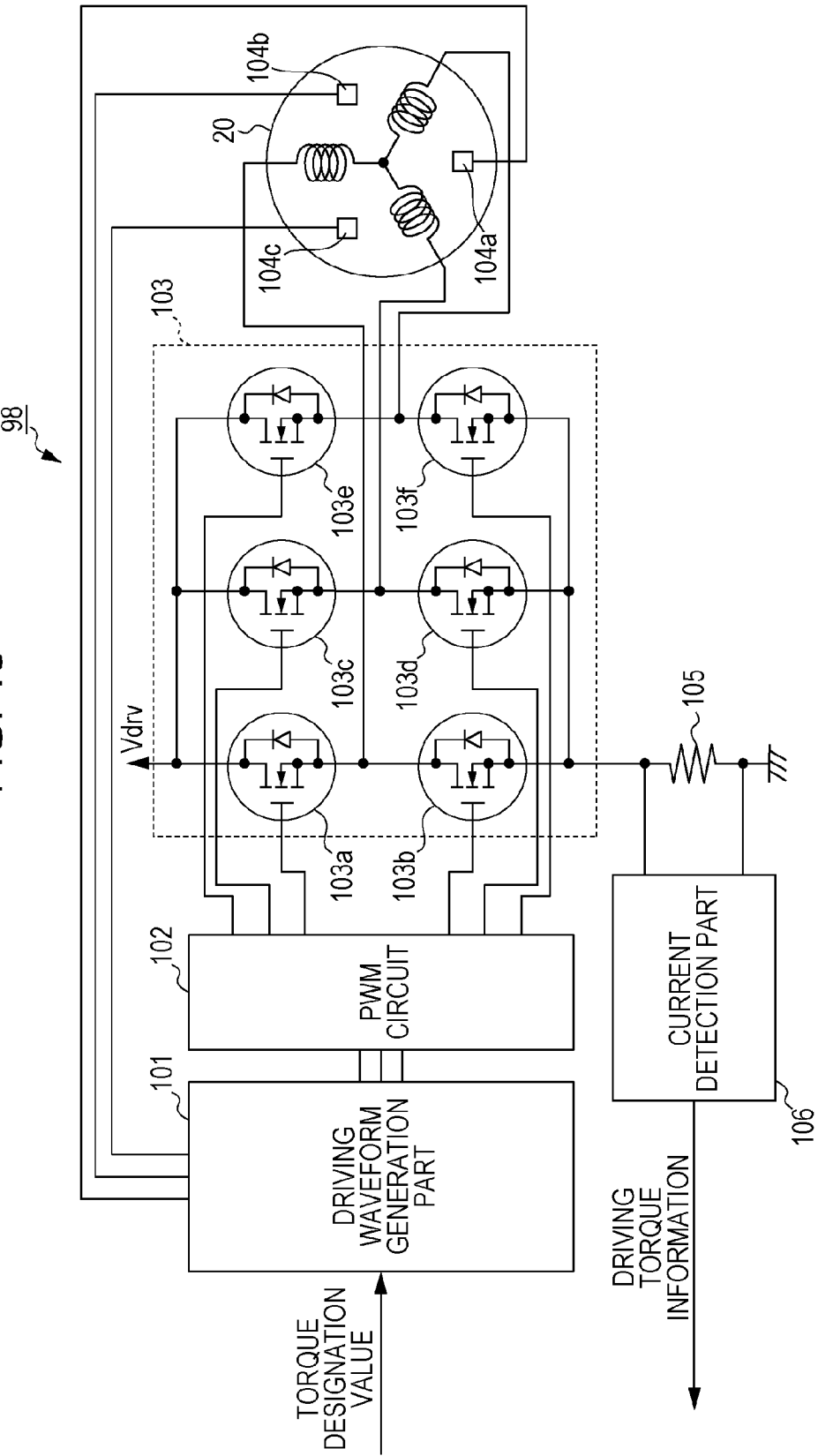
FIG. 19 is a schematic configuration diagram of a driver circuit.

FIG. 19 is a diagram illustrating a configuration of the driver circuit 98. In the driver circuit 98, a driving waveform generation part 101 generates a driving voltage waveform to be applied to individual coil terminals, on the basis of a torque designation value received from the control operation part 87 and the rotor rotation phase of the motor 20 detected by hole elements 104a to 104c. Then, the driving waveform generation part 101 outputs the driving voltage waveform to a pulse width modulation (PWM) circuit 102. The PWM circuit 102 converts the received driving voltage waveform into a pulse signal which is pulse-width modulated in accordance with a voltage value, and generates a control signal for an inverter circuit 103. The inverter circuit 103 turns on or off the switching elements 103a to 103f in accordance with the control signal received from the PWM circuit 102, and a driving current is supplied to the motor 20 to rotate the motor 20.

Detection of current is performed using a current detection resistor 105. As illustrated in FIG. 19, the current detection resistor 105 is connected in series between the source terminals of the switching elements 103b, 103d, and 103f and the ground. With this configuration, the total amount of current flowing to a coil of the motor 20 flows in the current detection resistor 105. A current detection part 106 measures the voltage across the current detection resistor 105, divides the measured voltage by the resistance value of the current detection resistor 105 to calculate a current value, and outputs the current value as driving torque information.

The driving torque information generated as described above is input to the voltage indication unit 92 of the drive transmission device 54. The voltage indication unit 92 includes a lookup table in which voltage indication values to be applied to the driven pulley 22 are stored in association with current values indicated by driving torque information. The voltage indication unit 92 determines a voltage indication value in accordance with the received driving torque information.

As described above, a current value serving as driving torque information is proportional to the driving force generated at the motor 20, that is, the driving force to be transmitted, and the driving force transmittable through the belt 23 is proportional to the square of the voltage applied to the driven pulley 22. Therefore, in the lookup table, a voltage indication value which is proportional to ½ square of the current value is stored, in accordance with the proportional relationship. Specifically, for example, the voltage indication vale for the current value 500 mA is 500 V, and the voltage indication value for the current value 1,000 mA is 707 V.

Furthermore, the drive transmission device 54 further changes (corrects) the voltage indication value determined based on the driving torque information, in accordance with slippage detection information output from the slippage detection unit 93. The slippage detection unit 93 compares output from the rotation angle detection unit 80 which detects the rotation angle of the driving pulley 21 with output from the rotation angle detection unit 90 which detects the rotation angle of the driven pulley 22, and detects occurrence of slippage. The slippage detection unit 93 includes a first counter circuit which counts pulse signals output from the rotation angle detection unit 80 and a second counter circuit which counts pulse signals output from the rotation angle detection unit 90 (both circuits are not illustrated).

The rotation angle detection unit 80 and the rotation angle detection unit 90 have similar functions, and both of them output 2,000 pulses per rotation. Furthermore, the drive transmission device 54 is configured to achieve deceleration transmission at a deceleration rate of 0.25. Therefore, if slippage does not occur, the rotation speed of the driving pulley 21 is four times the rotation speed of the driven pulley 22. Accordingly, if slippage does not occur, the count value at the first counter circuit is a value within a range of four times plus or minus 3 the count value of the second counter circuit.

The slippage detection unit 93 calculates a difference between the count value of the first counter circuit and the value four times the count value of the second counter circuit. When the absolute value of the calculated difference exceeds a predetermined threshold, it is determined that slippage has occurred, and the slippage detection unit 93 notifies the voltage indication unit 92 of the occurrence of slippage as slippage detection information. The predetermined threshold may be set to about "20", taking into consideration a minute deviation in detection timing and manufacturing errors and installing errors of the rotation angle detection units 80 and 90.

When the occurrence of slippage is notified from the slippage detection unit 93 by the slippage detection information, the voltage indication unit 92 adds a predetermined correction voltage value (correction amount) to the voltage indication value determined based on the driving torque information as described above, and outputs the obtained value as a new voltage indication value. That is, when the occurrence of slippage is detected, the voltage indication value is corrected so that an applied voltage value to the driven pulley 22 increases and friction force increases. The output voltage indication value is input to the voltage application unit 24. The voltage application unit 24 outputs a voltage corresponding to the received voltage indication value, and applies the voltage to the driven pulley 22 via the electro-conductive brush 28.

Next, an operation flow of the drive transmission device 54 will be explained. In the third embodiment, in place of FIG. 16 which is used for the explanation of the second embodiment, FIG. 20 will be used.

Figure 20:
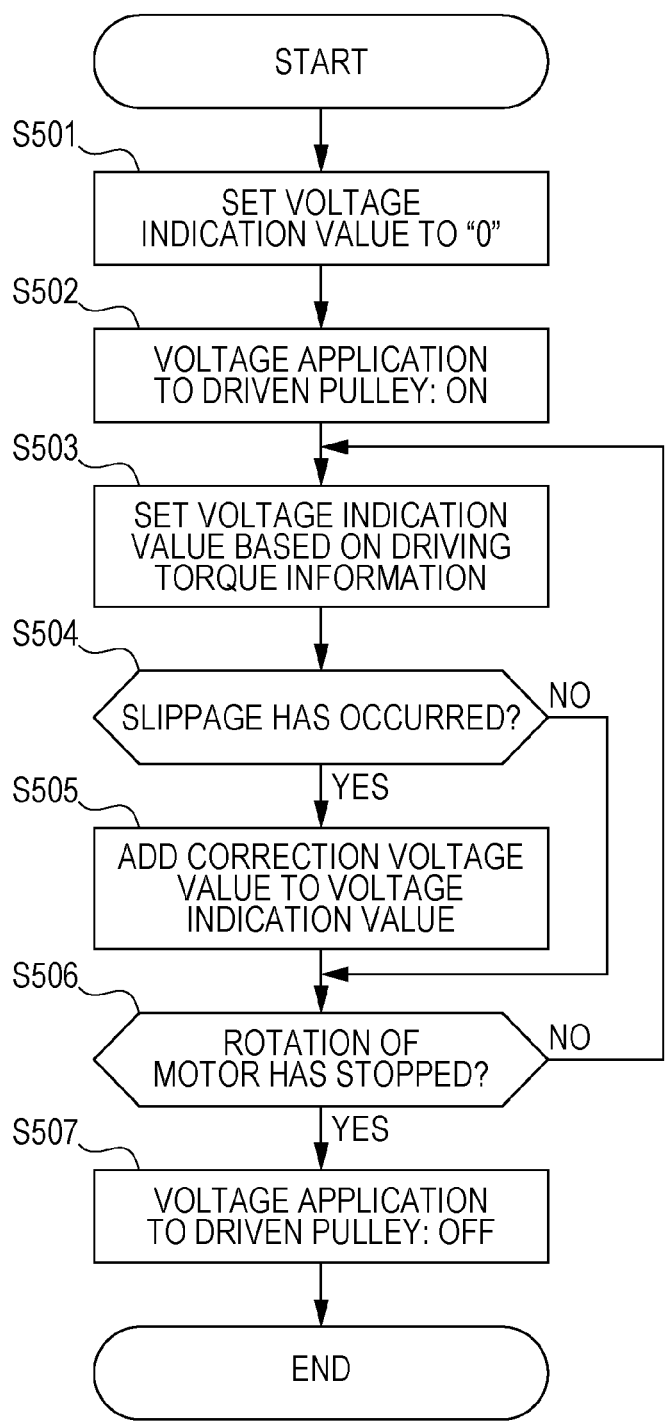
FIG. 20 is a flowchart of a process related to driving of a photosensitive drum.

FIG. 20 is a flowchart of a process related to driving of the photosensitive drum 1.

Before the drive transmission device 54 starts an operation, voltage application to the driven pulley 22 is OFF. When a rotation instruction signal for requesting start of rotation of the motor 2o is received from the CPU 110, the voltage indication unit 92 first sets the voltage indication value to an initial value "0" (step S501). The voltage application unit 24 starts to apply voltage to the driven pulley 22 (step S502).

After the voltage application starts, when the voltage indication unit 92 sets and outputs a voltage indication value corresponding to received driving torque information, the voltage application unit 24 applies the voltage to the driven pulley 22 in accordance with the voltage indication value (step S503).

Next, the voltage indication unit 92 determines, on the basis of received slippage detection information, whether or not slippage between the pulleys 21 and 22 and the belt 23 has occurred (step S504). When slippage has occurred, the voltage indication unit 92 adds a predetermined correction voltage value to the current voltage indication value, and outputs a corrected voltage indication value (step S505). Accordingly, the voltage application unit 24 applies the voltage to the driven pulley 22 in accordance with the corrected voltage indication value. After that, the process proceeds to step S506. In contrast, when slippage has not occurred, the process proceeds to step S506 without correction of the voltage indication value by the voltage indication unit 92.

In step S506, the voltage indication unit 92 observes information of rotation speed received from the motor control unit 91, and determines, on the basis of the rotation speed, whether or not the motor 20 has stopped. That is, at the point in time when the received rotation speed becomes approximately 0, the voltage indication unit 92 determines that the motor 20 has stopped. The processing of steps S503 to S506 is repeated until the motor 20 has stopped. Accordingly, voltage application to the driven pulley 22 continues to be performed while the voltage value being changed in accordance with driving torque information and slippage detection information.

In contrast, when it is determined that the motor 20 has stopped, the voltage indication unit 92 instructs the voltage application unit 24 to turn off the voltage application, and the voltage application to the driven pulley 22 by the voltage application unit 24 is stopped (step S507). After that, the process illustrated in FIG. 20 ends.

In the process illustrated in FIG. 20, when slippage is detected and a correction voltage value is added to a voltage indication value, accumulation of the amounts of addition may be stored as the amount of correction. After the current operation stops, when an operation resumes next time, the stored amount of correction may be added to the voltage indication value to reflect the correction. Thus, for example, even when a friction coefficient between a pulley and a belt or the like varies with time and therefore slippage becomes likely to occur, a voltage of an appropriate value which suppresses slippage can be applied at an early stage of the next operation.

In order to distinguish between sudden slippage and a change with time, the amount of addition may be stored only when slippage has occurred in a plurality of consecutive operations. Furthermore, the stored amount of addition may be cleared when maintenance of the drive transmission device 54, replacement of components of the drive transmission device 54, or the like is performed.

As explained above, in order to generate an appropriate electrostatic attraction force corresponding to driving force generated at the motor 20, the drive transmission device 54 determines a voltage value to be indicated to the voltage application unit 24.

Therefore, according to the third embodiment, regarding appropriately suppressing slippage between a pulley and a belt by efficiently generating necessary friction force without performing excessive voltage application, effects similar to those in the second embodiment can be achieved.

Furthermore, even when slippage occurs due to the influence of an unexpected load change or the like, by detecting the slippage and increasing an applied voltage for generating electrostatic attraction force, the influence of the slippage can be reduced to the minimum. Therefore, if slippage has occurred, it is possible to quickly cope with the slippage and maintain excellent drive transmission.

In the third embodiment, a measurement result of a current value flowing in the motor 20 is used as driving torque information. However, in place of the measurement result, a torque designation value output from the control operation part 87 of the motor control unit 91 may be used as driving torque information.

Furthermore, the slippage detection unit 93 detects slippage by comparing the rotation angle of the driving pulley 21 with the rotation angle of the driven pulley 22. However, detection of slippage may be performed in a different method. For example, it is also possible to detect slippage by using driving force generated at the motor 20. Specifically, when the driving force generated at the motor 20 under the speed control suddenly decreases to a predetermined threshold or less, it may be determined that slippage has occurred. Alternatively, by detecting only the rotation angle of the driven pulley 22, when the amount of change in the rotation speed of the driven pulley 22 relative to the amount of change in the driving force generated at the motor 20 is small, it may be determined that slippage has occurred.

In the second and third embodiments, examples of drive transmission devices which transmit driving force to the photosensitive drum 1 have been explained. However, the present invention is not limited to this. For example, the present invention is also suitably applicable to drive transmission for other units, such as the intermediate transfer belt 9 and the fixing device 17, which have been described in the second and third examples of the first embodiment. Alternatively, the drive transmission devices according to the first, second, and third embodiments may be combined together.

In each of the foregoing embodiments, the present invention is also applicable to an accelerating system including a driving pulley whose diameter is larger than the diameter of a driven pulley.

In the drive transmission devices according to the individual foregoing embodiments, electrostatic attraction force acquired for increasing friction force is mainly based on Coulomb's force. However, attraction force based on Johnsen-Rahbek force is not excluded from the scope of the present invention.

A drive transmission device according to an embodiment of the present invention is not necessarily applied to a portion explained in the embodiment. The present invention is also applicable to drive transmission to a driven unit in which variations in rotation load occurs in accordance with an operation state.

Therefore, the present invention is also applicable to a sheet processing apparatus and other various apparatuses, as well as an image forming apparatus. Furthermore, even when the present invention is applied to an image forming apparatus, the present invention is also applicable to image forming apparatuses of other types, such as a thermal transfer type and an inkjet type, as well as an electrophotographic type. For example, in the case of the inkjet type, a carriage belt for driving a carriage may serve as a driven unit. In the case of the thermal transfer type, a platen roller may serve as a driven unit.

Preferred embodiments of the present invention have been explained above. However, the present invention is not limited to these specific embodiments, and various forms may be included in the present invention without departing from the gist of the present invention. Some of the foregoing embodiments may be appropriately combined.

According to the present invention, power consumed by a drive transmission device for transmitting driving force may be reduced while generating necessary friction force for transmitting the driving force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-056229 filed Mar. 19, 2014, which is hereby incorporated by reference herein in its entirety.

What is claimed is:

1. A drive transmission device comprising:
   a motor;
   a first pulley configured to be driven to rotate by the motor;
   a second pulley configured to be connected to a device;
   a belt unit configured to be wound around the first pulley and the second pulley, the belt unit including a metal layer and a dielectric layer configured to be provided between the first pulley and the metal layer and between the second pulley and the metal layer;
   a voltage supply unit configured to supply voltage to the first pulley, the second pulley, or the belt;
   an acquisition unit configured to acquire information indicating load of the device; and
   a controller configured to control the voltage supplied from the voltage supply unit, based on the information acquired by the acquisition unit, and to generate an attraction force between the first pulley and the metal layer of the belt and an attraction force between the second pulley and the metal layer.

2. The drive transmission device according to claim 1,
   wherein the device has a plurality of modes,
   wherein the device is driven based on a target mode among the plurality of modes, and
   wherein the information is information related to the target mode.

3. The drive transmission device according to claim 1,
   wherein the controller acquires control information for controlling the motor when the device is driven, and controls the voltage supplied from the voltage supply unit on the basis of the control information and the information.

4. The drive transmission device according to claim 3,
   wherein the control information includes a rotation speed of the motor.

5. The drive transmission device according to claim 3,
   wherein the control information includes an input signal input to the motor.

6. The drive transmission device according to claim 1, further comprising:
   a determination unit configured to determine whether or not the belt has slipped,
   wherein the controller corrects the voltage supplied from the voltage supply unit on the basis of a determination result of the determination unit.

7. The drive transmission device according to claim 1,
   wherein the determination unit includes a first sensor configured to detect a rotation speed of the first pulley, and a second sensor configured to detect a rotation speed of the second pulley, and
   wherein the determination unit determines, on the basis of a detection result of the first sensor and a detection result of the second sensor, whether or not the belt has slipped.

8. An image forming apparatus comprising:
   a photosensitive member;
   an exposure unit configured to expose the photosensitive member to form an electrostatic latent image;
   a developing unit configured to develop the electrostatic latent image with toner to form an image on the photosensitive member;
   an intermediate transfer unit to which the image formed by the developing unit is transferred;
   a transfer unit configured to transfer to a sheet the image transferred to the intermediate transfer unit;
   a fixing unit configured to fix the image to the sheet by heating the sheet; and
   the drive transmission device according to claim 1,
   wherein the device is the photosensitive member.

9. The image forming apparatus according to claim 8,
wherein the device is the photosensitive member and a driving roller configured to rotate to drive the intermediate transfer unit.

10. The image forming apparatus according to claim 8,
wherein the device is the photosensitive member and a conveyance roller configured to be provided at the fixing unit and to rotate to convey the sheet.

11. A drive transmission device comprising:
a motor;
a first pulley including a dielectric layer and configured to be driven to rotate by the motor;
a second pulley including a dielectric layer and configured to be connected to a device;
a belt unit configured to be wound around the first pulley and the second pulley, the belt unit including a metal layer;
a voltage supply unit configured to supply voltage to the first pulley, the second pulley, or the belt;
an acquisition unit configured to acquire information indicating load of the device; and
a controller configured to control the voltage supplied from the voltage supply unit based on the information acquired by the acquisition unit and to generate an attraction force between the first pulley and the metal layer of the belt and an attraction force between the second pulley and the metal layer of the belt.

12. The drive transmission device according to claim 11,
wherein the device has a plurality of modes,
wherein the device is driven based on a target mode among the plurality of modes, and
wherein the information is information related to the target mode.

13. The drive transmission device according to claim 11,
wherein the controller acquires control information for controlling the motor when the device is driven, and controls the voltage supplied from the voltage supply unit on the basis of the control information and the information.

14. The drive transmission device according to claim 13,
wherein the control information includes a rotation speed of the motor.

15. The drive transmission device according to claim 13,
wherein the control information includes an input signal input to the motor.

16. The drive transmission device according to claim 11, further comprising:
a determination unit configured to determine whether or not the belt has slipped,
wherein the controller corrects the voltage supplied from the voltage supply unit on the basis of a determination result of the determination unit.

17. The drive transmission device according to claim 11,
wherein the determination unit includes a first sensor configured to detect a rotation speed of the first pulley, and a second sensor configured to detect a rotation speed of the second pulley, and
wherein the determination unit determines, on the basis of a detection result of the first sensor and a detection result of the second sensor, whether or not the belt has slipped.

18. An image forming apparatus comprising:
a photosensitive member;
an exposure unit configured to expose the photosensitive member to form an electrostatic latent image;
a developing unit configured to develop the electrostatic latent image with toner to form an image on the photosensitive member;
an intermediate transfer unit to which the image formed by the developing unit is transferred;
a transfer unit configured to transfer to a sheet the image transferred to the intermediate transfer unit;
a fixing unit configured to fix the image to the sheet by heating the sheet; and
the drive transmission device according to claim 11,
wherein the device is the photosensitive member.

19. The image forming apparatus according to claim 18,
wherein the device is the photosensitive member and a driving roller configured to rotate to drive the intermediate transfer unit.

20. The image forming apparatus according to claim 18,
wherein the device is the photosensitive member and a conveyance roller configured to be provide at the fixing unit and to rotate to convey the sheet.

* * * * *